United States Patent
Allec et al.

(10) Patent No.: US 12,204,289 B1
(45) Date of Patent: Jan. 21, 2025

(54) DEVICE REMOVAL INDICATION USING DIFFERENT OBJECT PROXIMITY THRESHOLDS

(71) Applicant: Apple Inc., Cupertino, CA (US)

(72) Inventors: Nicholas P. Allec, Champaign, IL (US); Ueyn L. Block, Menlo Park, CA (US); Xiyu Duan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 597 days.

(21) Appl. No.: 17/018,920

(22) Filed: Sep. 11, 2020

(51) Int. Cl.
| | | |
|---|---|---|
| *G04G 21/02* | (2010.01) | |
| *A44C 5/22* | (2006.01) | |
| *G01N 21/552* | (2014.01) | |
| *G04G 11/00* | (2006.01) | |

(52) U.S. Cl.
CPC ............ *G04G 21/02* (2013.01); *A44C 5/22* (2013.01); *G01N 21/552* (2013.01); *G04G 11/00* (2013.01)

(58) Field of Classification Search
CPC ...... G04G 21/02; G04G 11/00; G04G 21/025; G04B 47/063; G07C 9/28; G01B 21/552
See application file for complete search history.

(56) References Cited

U.S. PATENT DOCUMENTS

| | | | |
|---|---|---|---|
| 4,913,150 A | 4/1990 | Cheung et al. | |
| 4,931,767 A | 6/1990 | Albrecht | |
| 5,287,376 A | 2/1994 | Paoli | |
| 5,483,261 A | 1/1996 | Yasutake | |
| 5,488,204 A | 1/1996 | Mead et al. | |
| 5,488,678 A | 1/1996 | Taneya | |
| 5,617,439 A | 4/1997 | Kakimoto | |
| 5,644,667 A | 7/1997 | Tabuchi | |
| 5,742,631 A | 4/1998 | Paoli | |
| 5,825,352 A | 10/1998 | Bisset et al. | |
| 5,835,079 A | 11/1998 | Shieh | |

(Continued)

FOREIGN PATENT DOCUMENTS

| | | |
|---|---|---|
| CN | 103876726 | 6/2014 |
| CN | 203943664 | 11/2014 |

(Continued)

OTHER PUBLICATIONS

U.S. Appl. No. 16/812,152, filed Mar. 6, 2020, Mehra et al.

(Continued)

*Primary Examiner* — Sean Kayes
(74) *Attorney, Agent, or Firm* — Brownstein Hyatt Farber Schreck, LLP

(57) ABSTRACT

An electronic device includes a device body having a back surface, a band configured to fasten the device body to a user with the back surface facing a body part of the user, an optical sensor system, and a device removal detector. The optical sensor system has a first optical measurement path and a second optical measurement path. The first optical measurement path has a first optical path length that differs from a second optical path length of the second optical measurement path. The device removal detector is configured to generate a device removal indication responsive to either of, a first set of object proximity measurements received from the optical sensor system for the first optical measurement path, or a second set of object proximity measurements received from the optical sensor system for the second optical measurement path.

18 Claims, 8 Drawing Sheets

(56) References Cited

U.S. PATENT DOCUMENTS

| | | |
|---|---|---|
| 5,848,088 A | 12/1998 | Mori et al. |
| 5,880,411 A | 3/1999 | Gillespie et al. |
| 5,940,556 A | 8/1999 | Moslehi et al. |
| 6,083,172 A | 7/2000 | Baker, Jr. et al. |
| 6,094,270 A | 7/2000 | Uomon |
| 6,122,042 A | 9/2000 | Wunderman et al. |
| 6,188,391 B1 | 2/2001 | Seely et al. |
| 6,310,610 B1 | 10/2001 | Beaton et al. |
| 6,313,612 B1 | 11/2001 | Honda |
| 6,330,378 B1 | 12/2001 | Forrest |
| 6,345,133 B1 | 2/2002 | Morozov |
| 6,393,185 B1 | 5/2002 | Deacon |
| 6,526,300 B1 | 2/2003 | Kiani et al. |
| 6,533,729 B1 | 3/2003 | Khair |
| 6,584,136 B2 | 6/2003 | Ju et al. |
| 6,594,409 B2 | 7/2003 | Dutt et al. |
| 6,615,065 B1 | 9/2003 | Barrett et al. |
| 6,628,686 B1 | 9/2003 | Sargent |
| 6,657,723 B2 | 12/2003 | Cohen |
| 6,662,033 B2 | 12/2003 | Casciani et al. |
| 6,690,387 B2 | 2/2004 | Zimmerman et al. |
| 6,795,622 B2 | 9/2004 | Forrest |
| 6,882,874 B2 | 4/2005 | Huiku |
| 6,892,449 B1 | 5/2005 | Brophy et al. |
| 6,940,182 B2 | 9/2005 | Hilton et al. |
| 6,947,639 B2 | 9/2005 | Singh |
| 6,952,504 B2 | 10/2005 | Bi |
| 6,987,906 B2 | 1/2006 | Nakama et al. |
| 7,015,894 B2 | 3/2006 | Morohoshi |
| 7,054,517 B2 | 5/2006 | Mossberg |
| 7,058,245 B2 | 6/2006 | Farahi |
| 7,079,715 B2 | 7/2006 | Kish |
| 7,184,064 B2 | 2/2007 | Zimmerman et al. |
| 7,203,401 B2 | 4/2007 | Mossberg |
| 7,203,426 B2 | 4/2007 | Wu et al. |
| 7,206,621 B2 | 4/2007 | Aoyagi et al. |
| 7,209,611 B2 | 4/2007 | Joyner |
| 7,237,858 B2 | 7/2007 | Igarashi |
| 7,245,379 B2 | 7/2007 | Schwabe |
| 7,269,356 B2 | 9/2007 | Winzer |
| 7,283,694 B2 | 10/2007 | Welch |
| 7,314,451 B2 | 1/2008 | Halperin et al. |
| 7,324,195 B2 | 1/2008 | Packirisamy et al. |
| 7,366,364 B2 | 4/2008 | Singh |
| 7,444,048 B2 | 10/2008 | Peters et al. |
| 7,447,393 B2 | 11/2008 | Yan |
| 7,460,742 B2 | 12/2008 | Joyner |
| 7,477,384 B2 | 1/2009 | Schwabe |
| 7,483,599 B2 | 1/2009 | Dominic et al. |
| 7,526,007 B2 | 4/2009 | Chua et al. |
| 7,558,301 B2 | 7/2009 | Lin et al. |
| 7,616,110 B2 | 11/2009 | Crump et al. |
| 7,643,860 B2 | 1/2010 | Gueissaz |
| 7,663,607 B2 | 2/2010 | Hotelling et al. |
| 7,680,364 B2 | 3/2010 | Nilsson |
| 7,689,075 B2 | 3/2010 | Jenkins et al. |
| 7,720,328 B2 | 5/2010 | Yan |
| 7,798,634 B2 | 9/2010 | Miyahara et al. |
| 7,885,302 B2 | 2/2011 | Eberhard |
| 7,885,492 B2 | 2/2011 | Welch |
| 7,974,504 B2 | 7/2011 | Nagarajan |
| 8,019,400 B2 | 9/2011 | Diab et al. |
| 8,175,670 B2 | 5/2012 | Baker, Jr. et al. |
| 8,300,994 B2 | 10/2012 | Welch et al. |
| 8,378,811 B2 | 2/2013 | Crump et al. |
| 8,463,345 B2 | 6/2013 | Kuhn et al. |
| 8,515,217 B2 | 8/2013 | Bernasconi et al. |
| 8,559,775 B2 | 10/2013 | Babie et al. |
| 8,564,784 B2 | 10/2013 | Wang et al. |
| 8,618,930 B2 | 12/2013 | Papadopoulos et al. |
| 8,700,111 B2 | 4/2014 | LeBoeuf et al. |
| 8,724,100 B1 | 5/2014 | Asghari et al. |
| 8,792,869 B2 | 7/2014 | Prentice et al. |
| 8,873,026 B2 | 10/2014 | Puig |
| 8,920,332 B2 | 12/2014 | Hong et al. |
| 8,948,832 B2 | 2/2015 | Hong et al. |
| 8,983,250 B2 | 3/2015 | Black et al. |
| 9,020,004 B2 | 4/2015 | Jeong |
| 9,024,750 B2 * | 5/2015 | Defant ............... H04W 4/02 340/539.31 |
| 9,028,123 B2 | 5/2015 | Nichol |
| 9,031,412 B2 | 5/2015 | Nagarajan |
| 9,039,614 B2 | 5/2015 | Yuen et al. |
| 9,049,998 B2 | 6/2015 | Brumback et al. |
| 9,066,691 B2 | 6/2015 | Addison et al. |
| 9,091,715 B2 | 7/2015 | Alameh et al. |
| 9,110,259 B1 | 8/2015 | Black |
| 9,135,397 B2 | 9/2015 | Denyer et al. |
| 9,176,282 B2 | 11/2015 | Pottier |
| 9,217,669 B2 | 12/2015 | Wu et al. |
| 9,226,663 B2 | 1/2016 | Fei |
| 9,237,855 B2 | 1/2016 | Hong et al. |
| 9,241,635 B2 | 1/2016 | Yuen et al. |
| 9,274,507 B2 | 3/2016 | Kim et al. |
| 9,314,197 B2 | 4/2016 | Eisen et al. |
| 9,348,154 B2 | 5/2016 | Hayakawa |
| 9,360,554 B2 | 6/2016 | Retterath et al. |
| 9,370,689 B2 | 6/2016 | Guillama et al. |
| 9,392,946 B1 | 7/2016 | Sarantos |
| 9,405,066 B2 | 8/2016 | Mahgerefteh |
| 9,423,418 B2 | 8/2016 | Alameh et al. |
| 9,510,790 B2 | 12/2016 | Kang et al. |
| 9,513,321 B2 | 12/2016 | Frangen |
| 9,515,378 B2 | 12/2016 | Prasad |
| 9,526,421 B2 | 12/2016 | Papadopoulos et al. |
| 9,526,433 B2 | 12/2016 | Lapelina et al. |
| 9,543,736 B1 | 1/2017 | Barwicz et al. |
| 9,558,336 B2 | 1/2017 | Lee |
| 9,597,014 B2 | 3/2017 | Venkatraman et al. |
| 9,603,569 B2 | 3/2017 | Mirov et al. |
| 9,620,931 B2 | 4/2017 | Tanaka |
| 9,643,181 B1 | 5/2017 | Chang |
| 9,743,838 B2 | 8/2017 | Richards |
| 9,763,607 B1 | 9/2017 | Acosta et al. |
| 9,766,370 B2 | 9/2017 | Aloe et al. |
| 9,782,128 B2 | 10/2017 | Lee et al. |
| 9,784,829 B2 | 10/2017 | Zeng |
| 9,804,027 B2 | 10/2017 | Fish et al. |
| 9,829,631 B2 | 11/2017 | Lambert |
| 9,833,179 B2 | 12/2017 | Ikeda |
| 9,861,286 B1 | 1/2018 | Islam |
| 9,875,560 B2 | 1/2018 | Rajagopaian |
| 9,880,352 B2 | 1/2018 | Florjanczyk |
| 9,943,237 B2 | 4/2018 | Baker et al. |
| 9,946,020 B1 | 4/2018 | Horth |
| 9,948,063 B2 | 4/2018 | Caneau et al. |
| 9,952,433 B2 | 4/2018 | Um et al. |
| 9,974,466 B2 | 5/2018 | Kimmel |
| 10,009,668 B2 | 6/2018 | Liboiron-Ladouceur |
| 10,016,613 B2 | 7/2018 | Kavounas et al. |
| 10,032,557 B1 | 7/2018 | Bossetti |
| 10,092,197 B2 | 10/2018 | Han |
| 10,117,587 B2 | 11/2018 | Han |
| 10,132,996 B2 | 11/2018 | Lambert |
| 10,136,859 B2 | 11/2018 | Cutaia |
| 10,165,954 B2 | 1/2019 | Lee |
| 10,178,959 B1 | 1/2019 | Homyk |
| 10,181,021 B2 | 1/2019 | Verkatraman et al. |
| 10,188,330 B1 | 1/2019 | Kadlec et al. |
| 10,198,930 B2 * | 2/2019 | Melton ............... G08B 21/0272 |
| 10,203,454 B2 | 2/2019 | Liu |
| 10,238,351 B2 | 3/2019 | Halperin et al. |
| 10,241,476 B1 | 3/2019 | Moten |
| 10,243,684 B2 | 3/2019 | Wen |
| 10,271,745 B2 | 4/2019 | Gu et al. |
| 10,278,591 B2 | 5/2019 | Gil |
| 10,278,592 B2 | 5/2019 | Fish et al. |
| 10,285,898 B2 | 5/2019 | Douglas et al. |
| 10,310,196 B2 | 6/2019 | Hutchison |
| 10,317,200 B1 | 6/2019 | Han et al. |
| 10,372,160 B2 | 8/2019 | Lee et al. |
| 10,376,164 B2 | 8/2019 | Presura et al. |
| 10,417,513 B2 | 9/2019 | Lee |
| 10,429,597 B2 | 10/2019 | ten Have et al. |

(56) References Cited

U.S. PATENT DOCUMENTS

| | | |
|---|---|---|
| 10,433,739 B2 | 10/2019 | Weekly et al. |
| 10,444,067 B2 | 10/2019 | Hsu et al. |
| 10,485,437 B2 | 11/2019 | Wei et al. |
| 10,485,478 B1 | 11/2019 | Mirov |
| 10,529,003 B2 | 1/2020 | Mazed |
| 10,537,270 B2 | 1/2020 | Sarussi et al. |
| 10,559,708 B2 | 2/2020 | Chua |
| 10,586,525 B1 | 2/2020 | Wu et al. |
| 10,599,192 B2 | 3/2020 | Younes et al. |
| 10,610,157 B2 | 4/2020 | Pandya et al. |
| 10,627,783 B2 | 4/2020 | Rothkopf |
| 10,645,470 B2 | 5/2020 | Baxi et al. |
| 10,646,145 B2 | 5/2020 | Pekander et al. |
| 10,687,718 B2 | 6/2020 | Allec et al. |
| 10,702,211 B2 | 7/2020 | Clavelle et al. |
| 10,705,211 B2 | 7/2020 | Jacobs et al. |
| 10,741,064 B2 | 8/2020 | Schwarz et al. |
| 10,760,955 B2 | 9/2020 | Chu et al. |
| 10,795,508 B2 | 10/2020 | Han et al. |
| 10,799,133 B2 | 10/2020 | Lee |
| 10,806,386 B2 | 10/2020 | Lobbestael et al. |
| 10,843,066 B2 | 11/2020 | Nicoli |
| 10,852,492 B1 | 12/2020 | Vermeulen et al. |
| 10,874,348 B1* | 12/2020 | Han .................. A61B 5/6843 |
| 10,918,322 B2 | 2/2021 | Shao |
| 10,984,645 B2* | 4/2021 | Wojcik .................. G08B 21/22 |
| 10,966,643 B1 | 5/2021 | Vavadi |
| 10,996,399 B2 | 5/2021 | Yang et al. |
| 11,018,524 B2 | 5/2021 | Simpson |
| 11,035,318 B2 | 6/2021 | Kuboyama et al. |
| 11,156,497 B2 | 10/2021 | Bismuto et al. |
| 11,158,996 B2 | 10/2021 | Bismuto et al. |
| 11,169,096 B1* | 11/2021 | Segal .................. G08B 21/22 |
| 11,190,556 B2 | 11/2021 | Meiyappan et al. |
| 11,224,381 B2 | 1/2022 | McHale et al. |
| 11,226,459 B2 | 1/2022 | Bishop et al. |
| 11,255,663 B2 | 2/2022 | Binder |
| 11,309,929 B2 | 4/2022 | Wong |
| 11,482,513 B2 | 10/2022 | Krasulick et al. |
| 11,511,440 B2 | 11/2022 | Polanco et al. |
| 11,857,298 B1 | 1/2024 | Allec et al. |
| 2002/0029128 A1 | 3/2002 | Jones et al. |
| 2002/0188210 A1* | 12/2002 | Aizawa ............ A61B 5/02433 |
| | | 600/502 |
| 2005/0053112 A1 | 3/2005 | Shams-Zadeh-Amiri |
| 2005/0063431 A1 | 3/2005 | Gallup et al. |
| 2006/0002443 A1 | 1/2006 | Farber et al. |
| 2006/0253010 A1* | 11/2006 | Brady .................. G04G 21/025 |
| | | 600/324 |
| 2008/0044128 A1 | 2/2008 | Kish et al. |
| 2008/0310470 A1 | 12/2008 | Ooi et al. |
| 2010/0158067 A1 | 6/2010 | Nakatsuka et al. |
| 2012/0119920 A1 | 5/2012 | Sallop |
| 2012/0310062 A1 | 12/2012 | Li et al. |
| 2013/0030267 A1 | 1/2013 | Lisogurski et al. |
| 2014/0029943 A1 | 1/2014 | Mathai et al. |
| 2014/0069951 A1 | 3/2014 | Schmidt et al. |
| 2014/0073968 A1 | 3/2014 | Engelbrecht et al. |
| 2015/0054348 A1 | 2/2015 | Akiya |
| 2015/0099943 A1 | 4/2015 | Russell |
| 2015/0164352 A1 | 6/2015 | Yoon et al. |
| 2016/0129279 A1 | 5/2016 | Ferolito |
| 2016/0224750 A1 | 8/2016 | Kethman et al. |
| 2016/0278712 A1 | 9/2016 | Sagara |
| 2016/0296174 A1 | 10/2016 | Isikman et al. |
| 2017/0095216 A1 | 4/2017 | Laty |
| 2017/0115825 A1 | 4/2017 | Eriksson et al. |
| 2017/0135633 A1 | 5/2017 | Connor |
| 2017/0164878 A1 | 6/2017 | Connor |
| 2017/0172476 A1 | 6/2017 | Schilthuizen |
| 2017/0251963 A1 | 9/2017 | Hashimoto et al. |
| 2017/0315511 A1 | 11/2017 | Shim et al. |
| 2017/0347902 A1* | 12/2017 | Van Gool .......... A61B 5/02427 |
| 2018/0014785 A1 | 1/2018 | Li |
| 2018/0073924 A1 | 3/2018 | Steinmann et al. |
| 2018/0085040 A1 | 3/2018 | Ferber et al. |
| 2018/0098708 A1 | 4/2018 | Lee |
| 2018/0227754 A1* | 8/2018 | Paez Velazquez .......................... |
| | | H04L 63/0428 |
| 2018/0344175 A1 | 12/2018 | Rulkov et al. |
| 2019/0015045 A1* | 1/2019 | Li .......................... G04C 3/002 |
| 2019/0069781 A1* | 3/2019 | Kim ........................ A61B 5/681 |
| 2019/0072912 A1 | 3/2019 | Pandya et al. |
| 2019/0083034 A1 | 3/2019 | Shim et al. |
| 2019/0090766 A1 | 3/2019 | Block et al. |
| 2019/0090806 A1 | 3/2019 | Clavelle et al. |
| 2019/0167124 A1 | 6/2019 | Verkruijsse et al. |
| 2019/0304464 A1* | 10/2019 | Sakurai .................. G06F 1/163 |
| 2019/0339468 A1 | 11/2019 | Evans et al. |
| 2019/0342009 A1 | 11/2019 | Evans et al. |
| 2020/0085374 A1 | 3/2020 | Lin et al. |
| 2020/0163616 A1 | 5/2020 | Sakaya |
| 2020/0253547 A1 | 8/2020 | Harris et al. |
| 2020/0297955 A1 | 9/2020 | Shouldice |
| 2021/0093237 A1 | 4/2021 | Venugopal et al. |
| 2021/0194481 A1 | 6/2021 | Rademeyer |
| 2021/0278561 A1 | 9/2021 | Mehra et al. |
| 2022/0011157 A1 | 1/2022 | Bismuto et al. |
| 2022/0059992 A1 | 2/2022 | Hill et al. |
| 2022/0075036 A1 | 3/2022 | Zhou et al. |
| 2022/0085231 A1 | 3/2022 | Liu et al. |
| 2022/0091333 A1 | 3/2022 | Wu |
| 2022/0099896 A1 | 3/2022 | Arbore et al. |
| 2023/0190167 A1* | 6/2023 | Jung ...................... A61B 5/332 |
| | | 600/479 |
| 2023/0404419 A1 | 12/2023 | Allec et al. |

FOREIGN PATENT DOCUMENTS

| | | |
|---|---|---|
| CN | 109589095 | 4/2019 |
| CN | 109645972 | 4/2019 |
| EP | 1403985 | 3/2004 |
| EP | 1432045 | 6/2004 |
| EP | 3451117 | 3/2019 |
| EP | 3561561 | 10/2019 |
| FR | 2949024 | 2/2011 |
| JP | S60127776 | 7/1985 |
| JP | S63177495 | 7/1988 |
| JP | 2000163031 | 6/2000 |
| JP | 2002342033 | 11/2002 |
| JP | 2008262118 | 10/2008 |
| KR | 20180042472 | 4/2018 |
| WO | WO 01/014929 | 3/2001 |
| WO | WO 02/011339 | 2/2002 |
| WO | WO 04/031824 | 4/2004 |
| WO | WO 05/091036 | 9/2005 |
| WO | WO 11/090274 | 7/2011 |
| WO | WO 15/051253 | 4/2015 |
| WO | WO 15/094378 | 6/2015 |
| WO | WO 15/105881 | 7/2015 |
| WO | WO 17/040431 | 3/2017 |
| WO | WO 17/184420 | 10/2017 |
| WO | WO 17/184423 | 10/2017 |
| WO | WO 19/152990 | 8/2019 |
| WO | WO 19/185903 | 10/2019 |
| WO | WO 20/106974 | 5/2020 |

OTHER PUBLICATIONS

U.S. Appl. No. 17/013,217, filed Sep. 4, 2020, Allec et al.
U.S. Appl. No. 17/020,659, filed Sep. 14, 2020, Duan et al.
U.S. Appl. No. 17/473,745, filed Sep. 13, 2021, Liu et al.
U.S. Appl. No. 17/018,985, filed Sep. 11, 2020, Shaga et al.
Gonzalez-Sanchez et al., "Capacitive Sensing for Non-Invasive Breathing and Heart Monitoring in Non-Restrained, Non-Sedated Laboratory Mice," Sensors 2016, vol. 16, No. 1052, pp. 1-16.
He et al., "Integrated Polarization Compensator for WDM Waveguide Demultiplexers," IEEE Photonics Technology Letters vol. 11, No. 2, Feb. 1999, pp. 224-226.
Kybartas et al., "Capacitive Sensor for Respiratory Monitoring," Conference "Biomedical Engineering," Nov. 2015, 6 pages.

(56) References Cited

OTHER PUBLICATIONS

Lapedus, "Electroplating IC Packages—Tooling challenges increase as advanced packaging ramps up," Semiconductor Engineering, https://semiengineering.com/electroplating-ic-packages, Apr. 10, 2017, 22 pages.
Materials and Processes for Electronic Applications, Series Editor: James J. Licari, AvanTeco, Whittier, California, Elsevier Inc., 2009, 20 pages.
Worhoff et al., "Flip-chip assembly for photonic circuits," MESA+ Research Institute, University of Twente, Integrated Optical MicroSystems Group, The Netherlands, 12 pages.

* cited by examiner

DEVICE REMOVAL INDICATION USING DIFFERENT OBJECT PROXIMITY THRESHOLDS

FIELD

The described embodiments generally relate to device removal indication and, more particularly, to device removal indication based on optical object proximity detection.

BACKGROUND

Wearable devices include electronic devices such as electronic watches, smart watches, smart phones, health monitoring devices, fitness monitoring devices, audio playback devices, and so on. Some wearable devices require a user to undergo an authentication (e.g., input and matching of a passcode or biometric) before some or all of the functions of the device are unlocked. When a successful authentication is completed while the device is being worn, the device may remain in an unlocked state as long as the device continues to be worn. When the device is removed from the user, the device may return to a locked state that requires re-authentication of the user.

Some wearable devices require the device to be worn before a sensing function is enabled and/or performed. These devices may disable the sensing function when the device is removed from a user and is no longer being worn.

In these and other cases, a wearable device may include an off-wrist detector that generates an off-wrist indication when the device is removed from a user (i.e., when the device is no longer being worn).

SUMMARY

Embodiments of the systems, devices, methods, and apparatus described in the present disclosure are directed to electronic devices that include device removal detectors. More particularly, the described devices include an optical sensor system having one or more electromagnetic radiation emitters and one or more electromagnetic radiation detectors. The device may define one or more optical measurement paths between the electromagnetic radiation emitter(s) and electromagnetic radiation detector(s). In some embodiments, the electromagnetic radiation emitter(s) and electromagnetic radiation detector(s) may include one or more infrared (IR) emitters and detectors. An amount of electromagnetic radiation emitted by an electromagnetic radiation emitter and returned to an electromagnetic radiation detector over one of the optical measurement paths (e.g., an amount of electromagnetic radiation that reflects or scatters off of an object, such as a user's wrist or other body part) may be measured by an electromagnetic radiation detector and compared to one or more thresholds to determine when a device is no longer being worn (e.g., to determine when the device has been removed from a user's body). One of the thresholds may be a loose wear threshold, indicating that the device is not closely fitted to a user's body. Additionally or alternatively, one of the thresholds may be a time-lapsed device removal threshold (i.e., a threshold that applies to an amount of electromagnetic radiation sensed over time). The time-lapsed device removal threshold may be less or greater than the loose wear threshold, and in some embodiments may not trigger a device removal indication unless one or more (or all) of the measurements in a subset of multiple measurements obtained during a discrete time window is/are less than the loose wear threshold. Additionally or alternatively, one of the thresholds may be an instant-off device removal threshold (e.g., a threshold that is satisfied when it is met by a single measurement, such as a threshold that is satisfied when a sensed amount of electromagnetic radiation is less than the threshold).

In some cases, different thresholds (e.g., the time-lapsed device removal threshold and the instant-off device removal threshold) may be used to detect the removal of devices having different types of bands, or at least one threshold may be used to account for one or more corner cases in device removal. For example, a device that is attached to a user by a band having a separable closure may have a different removal sequence than a device that is attached to a user by a band that forms a non-separable loop (e.g., a non-separable loop band) and, at least for some users, the different removal sequences may necessitate different optical measurement paths and/or different thresholds for detecting device removal. Various examples of the described embodiments are summarized below.

In a first aspect, the present disclosure describes an electronic device. The electronic device may include a device body having a back surface, a band configured to fasten the device body to a user with the back surface facing a body part of the user, an optical sensor system, and a device removal detector. The optical sensor system may define a first optical measurement path and a second optical measurement path. The first optical measurement path may have a first optical path length that differs from a second optical path length of the second optical measurement path. The device removal detector may be configured to generate a device removal indication responsive to either of, a first set of object proximity measurements received from the optical sensor system for the first optical measurement path, or a second set of object proximity measurements received from the optical sensor system for the second optical measurement path.

In a second aspect, the present disclosure describes a wearable device. The wearable device may include a device body having a back surface, an electromagnetic radiation emitter mounted to the device body and configured to emit electromagnetic radiation through the back surface, an electromagnetic radiation detector mounted to the device body and configured to detect a returned portion of the electromagnetic radiation emitted by the electromagnetic radiation emitter, and a processor. The processor may be configured to receive indications of an amount of electromagnetic radiation received by the electromagnetic radiation detector during each sample period in a set of sample periods and, under some conditions, generate an indication that the wearable device is no longer worn by a user. The indication may be generated after determining that a first amount of electromagnetic radiation received by the electromagnetic radiation detector during a sample period is less than a first threshold, and after determining that a second amount of electromagnetic radiation received by the electromagnetic radiation detector is less than a second threshold. The second amount of electromagnetic radiation may be received during a discrete time window including multiple sample periods, with the multiple sample periods including the sample period for which the first amount of electromagnetic radiation is less than the first threshold.

In a third aspect, the present disclosure describes another electronic device. The electronic device may include an optical sensor system and an off-wrist detector. The optical sensor system may include at least one electromagnetic radiation emitter configured to emit electromagnetic radiation toward a target, and at least one electromagnetic radiation detector configured to detect a portion of the emitted electromagnetic radiation returned from the target and generate a set of object proximity measurements. The off-wrist detector may be configured to generate an off-wrist indication after identifying either of: a subset of multiple object proximity measurements, in the first set of object proximity measurements, that satisfy a time-lapsed device removal threshold, or a singular measurement in the set of object proximity measurements that is less than an instant-off device removal threshold. The instant-off device removal threshold may be less than the time-lapsed device removal threshold (i.e., the instant-off device removal threshold may correspond to a lower amount of returned electromagnetic radiation, which may indicate a relatively greater distance between the electronic device and the target).

In addition to the exemplary aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
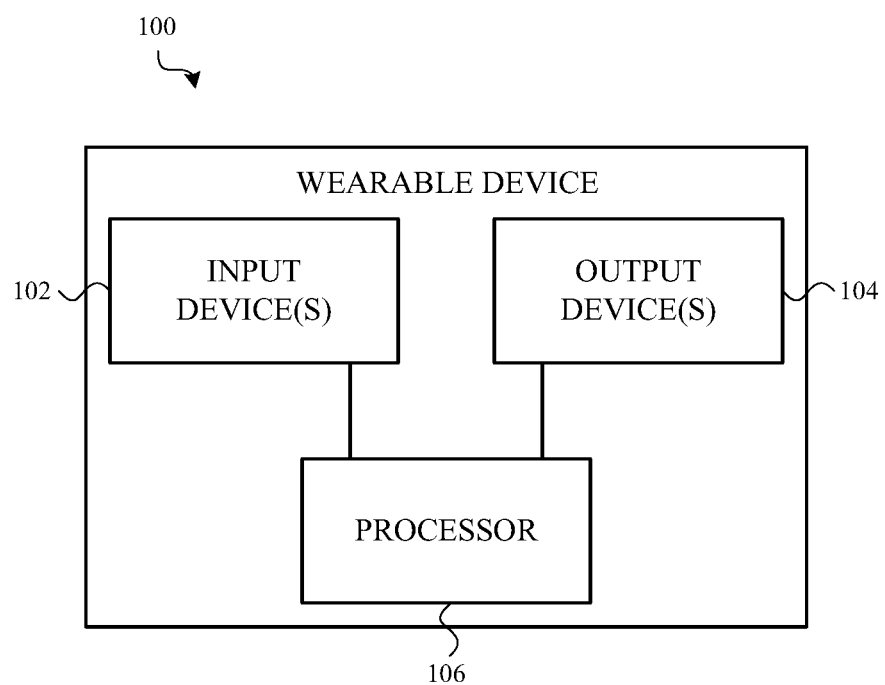
FIG. 1 shows an example functional block diagram of a device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

As previously discussed, there are scenarios in which it may be desirable for a wearable device to detect if or when it has been removed from its user. To this end, a wearable device may include a device removal detector. In the case of a wrist-worn device, such as an electronic watch or smart watch, the device removal detector may be referred to herein as an off-wrist detector. The device removal detector may include, for example, a processor and/or other circuitry, with the processor being programmed to operate as a device removal detector by software, firmware, or other electronic instructions stored in memory.

In some cases, a device removal detector may include an optical sensor system having an electromagnetic radiation emitter and an electromagnetic radiation detector. The electromagnetic radiation emitter may emit light through a back surface of a wearable device, toward a body part on which the wearable device is worn. The electromagnetic radiation detector may detect a returned portion of the emitted electromagnetic radiation (e.g., a portion of the emitted electromagnetic radiation that reflects or scatters off of the body part and is directed back toward the electromagnetic radiation detector). In some cases, the returned portion of the emitted electromagnetic radiation may have a known, determinable, and in some cases configurable relationship with a distance between the back surface of the wearable device and the body part on which the wearable device is worn. For example, when the returned portion of the emitted electromagnetic radiation is greater than a first amount, the device removal detector may determine that the wearable device is being closely worn by a user (e.g., the back surface of the wearable device may be on (i.e., abutted up against) a body part of the user). When the returned portion of the emitted electromagnetic radiation is between the first amount and a second amount, with the second amount being less than the first amount, the device removal detector may determine that the wearable device is being loosely worn by the user (e.g., the back surface of the wearable device may be off, but within 10 millimeters (mm) of, the body part of the user). When the returned portion of the emitted electromagnetic radiation is less than the second amount, the device removal detector may determine that the wearable device has been removed from the body part of the user. The first amount of electromagnetic radiation may in some cases be referred to herein as a loose wear threshold, and the second amount of electromagnetic radiation may in some cases be referred to herein as an instant-off threshold. When the loose wear threshold is met, the device removal detector may not trigger a device removal indication or, alternatively, the device removal detector may require one or more subsequent conditions to be met before indicating that the wearable device is no longer being worn. When the instant-off threshold is met, the device removal detector may indicate that the wearable device has been removed without any subsequent condition being met.

In some embodiments, each of the first and second amounts of electromagnetic radiation may be determined (e.g., adaptively determined) in relation to a baseline for a particular user. In some cases, the baseline may be an amount of emitted electromagnetic radiation returned to the electromagnetic radiation detector when the wearable device is positioned against the user's body part, or an amount of emitted electromagnetic radiation that is normally returned to the electromagnetic radiation detector when the wearable device is worn by the user, or an average amount of emitted electromagnetic radiation that has been returned to the electromagnetic radiation detector in the immediate past (e.g., over the last 5 seconds).

The device removal detector described above may work well in some scenarios, but may be prone to miss device removal events in other scenarios. For example, the device removal detector described above may work well for users having particular body part characteristics (e.g., skin within a particular range of colors, hair less than a particular amount and/or within a particular range of colors, and so on), particular device wear characteristics (e.g., close or relatively close wear of their wearable device), and/or particular device characteristics (e.g., a wearable device that attaches to a body part using a band with a separable closure instead of a band that forms a non-separable loop). The device removal detector described above may not work, or may not work as consistently, for other combinations of users, device wear characteristics, or device characteristics. For example, the device removal detector described above may not work, or may not work as consistently, for certain users of wearable devices having particular types of non-separable loop bands (e.g., non-separable loop bands having relatively higher reflectivity). In these and other scenarios, a different type or configuration of device removal detector may be needed to detect, or consistently detect, device removal events.

Some device removal detectors described herein may include a different or second optical measurement path, for which different device wear and/or device removal thresholds are configured. The different or second optical measurement path may be associated with a different optical path length (e.g., a different emitter/detector spacing, a different emitter and/or detector size, a different lens, film, or other optical element disposed over its emitter or detector, and so on) and/or a different proximity detection curve (e.g., a proximity detection curve having a different peak signal value and/or a different rate of decay from its peak signal value). Additionally or alternatively, some device removal detectors described herein may apply a different set of one or more device removal thresholds to a set of measurements received from an optical sensor system for an optical measurement path. The different set of device removal thresholds may include, for example, a loose wear threshold and a time-lapsed device removal threshold. The time-lapsed device removal threshold may be, for example, an average amount of electromagnetic radiation received by an electromagnetic radiation detector over a subset of multiple sample periods included within a discrete time window, or a total amount of electromagnetic radiation received over the subset of multiple sample periods, or a requirement that each measurement within the discrete time window satisfy a threshold. In some cases, a device removal detector may determine an average amount of electromagnetic radiation received per sample period in the subset of multiple sample periods (or a total amount of electromagnetic radiation received during the subset of multiple sample periods) and compare the average amount (or total amount) to the time-lapsed device removal threshold. If the received electromagnetic radiation is less than the time-lapsed device removal threshold, a device removal indication may be generated. In some cases, the device removal detector may also determine whether one or more (or all) of the measurements in the subset of multiple sample periods is/are less than a loose wear threshold, and only generate the indication of device removal when the loose wear threshold is also met.

These and other systems, devices, methods, and apparatus are described with reference to FIGS. 1-8. However, those skilled in the art will readily appreciate that the detailed description given herein with respect to these figures is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components from being oriented in different ways. Also, as used herein, the phrase "at least one of" preceding a series of items, with the term "and" or "or" used to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

FIG. 1 shows an example functional block diagram of an electronic device (or device) 100. In some examples, the device 100 may be a wearable device, such as an electronic watch, smart watch, smart phone, health monitoring device, fitness monitoring device, or audio playback device that is wearable on a wrist of a user. The device 100 may also or alternatively be wearable on an ankle, arm, forehead, waist, or other body part, or may be positionable or attachable to another device (e.g., a seat cushion or bed). The device 100 may include one or more input devices 102, one or more output devices 104, and a processor 106 (which processor may be a singular processor, a set of multiple processors, and/or a processor in combination with supporting circuitry). Broadly, the input device(s) 102 may detect various types of user input or sense various types of parameters, and the output device(s) 106 may provide various types of outputs.

In some cases, user input and/or parameters that are sensed by the input device(s) 102 may be used to control one or more settings, functions, or other aspects of the device 100, or may be provided to a remote device. In some cases, one or more of the output devices 104 may be configured to provide output that is dependent on, or manipulated in response to, the user input and/or parameters sensed by one or more of the input devices 102. The outputs provided by one or more of the output devices 104 may also be responsive to, or initiated by, a program or application that is executed by the processor 106 and/or an associated companion device.

The processor 106 may be operably coupled to the input devices 102 and the output devices 104. The processor 106 may receive inputs (e.g., signals, statuses, and/or measurements) directly or indirectly from the input device(s) 102, in response to user input and/or parameters sensed by the input device(s) 102. In some cases, the processor 106 may interpret the inputs. In response to the inputs, or interpreted inputs, the processor 106 may maintain or alter one or more settings, functions, or aspects of the device 100 and, in some cases, the processor 106 may provide signals, data, or instructions to one or more of the output devices 104. In some cases, the processor 106 may provide signals, data, or instructions to one or more of the output devices 104 independently of any input received from an input device 102. A signal, data, or instruction provided to an output device 104 may cause the output device 104 to generate one or more outputs (e.g., an audio output, a visual output, a tactile output, one or more signals or instructions, and so on). Examples of suitable processors are discussed in more detail below with reference to FIG. 8.

In various embodiments, the input device(s) 102 may include any suitable components for detecting user input and/or sensing device, user, and/or environmental parameters. Examples of input devices 102 include audio sensors (e.g., microphones), optical or visual sensors (e.g., cameras, proximity sensors, and/or other electromagnetic radiation detectors (e.g., visible light or IR electromagnetic radiation)), other types of proximity sensors, touch sensors, force sensors, pressure sensors, mechanical devices (e.g., crowns, switches, buttons, or keys), vibration sensors, thermal sensors, self-mixing interferometry sensors, orientation sensors, motion sensors (e.g., accelerometers or velocity sensors), location sensors (e.g., global positioning system (GPS) devices), magnetic sensors, communication devices (e.g., wired or wireless communication devices), electroactive polymers (EAPs), resistive sensors, strain gauges, capacitive sensors, electrodes, and so on, or some combination thereof. Each input device 102 may be configured to detect one or more particular types of user input or parameter, and may provide one or more signals, statuses, or measurements corresponding to the detected user input and/or sensed parameter(s). The signals, statuses, or measurements may be provided, for example, to the processor 106 (or to a memory that can be accessed by the processor).

The output devices 104 may include any suitable components for generating or communicating outputs. Examples of output devices 104 include audio output devices (e.g., speakers), visual output devices (e.g., lights, displays, or other electromagnetic radiation emitters), tactile output devices (e.g., haptic output devices), communication devices (e.g., wired or wireless communication devices), and so on, or some combination thereof. Each output device 104 may be configured to receive signals, data, or instructions from the processor 106 and/or one or more of the input devices 102, and to provide one or more outputs dictated by the signals, data, or instructions.

In some examples, the output device(s) 104 may include one or more electromagnetic radiation emitters, and the input device(s) 102 may include one or more electromagnetic radiation detectors (e.g., one or more photodiodes). The electromagnetic radiation emitter(s) and detector(s) may define part or all of an optical sensor system. At least one of the electromagnetic radiation emitters may emit a beam (or flood) of electromagnetic radiation into an object detection space adjacent the device 100 (e.g., a space including a user's wrist or other body part to which the device 100 is strapped). In some embodiments, one or more of the electromagnetic radiation emitters may be an IR emitter. One or more of the electromagnetic radiation detectors may be filtered to detect a set of wavelengths that includes electromagnetic radiation emitted by one or more of the electromagnetic radiation emitters. In some embodiments, one or more of the electromagnetic radiation detectors may be an IR electromagnetic radiation detector.

The processor 106 may in some cases be configured to operate as a device removal detector (or as part of a device removal detector). The device removal detector may indicate, at least partly in response to indications of amounts of electromagnetic radiation received by one or more electromagnetic radiation detectors (e.g., object proximity measurements) generated by one or more electromagnetic radiation detectors, whether the device 100 has been removed from its user (e.g., taken off a wrist of the user).

In some examples, the electromagnetic radiation emitters and detectors of the optical sensor system may define multiple optical measurement paths (e.g., first and second optical measurement paths), as described for example with reference to FIGS. 6A-6D. A first optical measurement path may have a first set of parameters that differs from a second set of parameters of the second optical measurement path. For example, the first and second optical measurement paths may have different optical path lengths. The processor 106, when operating as a device removal detector, may receive a first set of object proximity measurements for the first optical measurement path (e.g., indications of amounts of light, or distances correlated thereto), and a second set of object proximity measurements for the second optical measurement path. In some cases, the processor 106 may compare each measurement in the first subset of object proximity measurements to a first threshold (an instant off device removal threshold) and generate a device removal indication when a singular measurement in the first set of object proximity measurements is less than a first threshold. The processor 106 may also compare each measurement in the second subset of object proximity measurements to a second threshold (a loose wear threshold). The processor 106 may further determine whether a subset of multiple measurements in the second subset of object proximity measurements is less than a time-lapsed device removal threshold. For example, the processor 106 may determine an average (or total) amount of electromagnetic radiation represented by the subset of multiple object proximity measurements, compare the average (or total) amount of electromagnetic radiation to the time-lapsed device removal threshold, and generate a device removal indication when 1) the average (or total) amount of electromagnetic radiation is less than the time-lapsed device removal threshold, and 2) at least one measurement in the subset of multiple object proximity measurements is less than the loose wear threshold (or alternatively, the processor 106 may require that all of the object proximity measurements in the subset of multiple object proximity measurements are less than the loose wear threshold). Device removal may also or alternatively be indicated in response to other comparisons and/or combinations of object proximity measurements.

In some examples, the electromagnetic radiation emitters and detectors of the optical sensor system may define a single optical measurement path. The processor 106, when operating as a device removal detector, may then apply different thresholds, or sets of thresholds, to a set of object proximity measurements for the optical measurement path. In some cases, the processor 106 may compare each measurement in the subset of object proximity measurements to a first threshold (an instant off device removal threshold) and generate a device removal indication when a singular measurement in the set of object proximity measurements is less than a first threshold. The processor 106 may also compare each measurement in the subset of object proximity measurements to a second threshold (a loose wear threshold). The processor 106 may further determine whether a subset of multiple object proximity measurements in the subset of object proximity measurements is less than a time-lapsed device removal threshold. For example, the processor 106 may determine an average (or total) amount of electromagnetic radiation represented by the subset of multiple object proximity measurements, compare the average (or total) amount of electromagnetic radiation to the time-lapsed device removal threshold, and generate a device removal indication when 1) the average (or total) amount of electromagnetic radiation is less than the time-lapsed device removal threshold, and 2) at least one measurement in the subset of multiple object proximity measurements is less than the loose wear threshold (or alternatively, the processor 106 may require that all of the object proximity measurements in the subset of multiple object proximity measurements are less than the loose wear threshold). Device removal may also or alternatively be indicated in response to other comparisons and/or combinations of object proximity measurements.

Figure 2A:
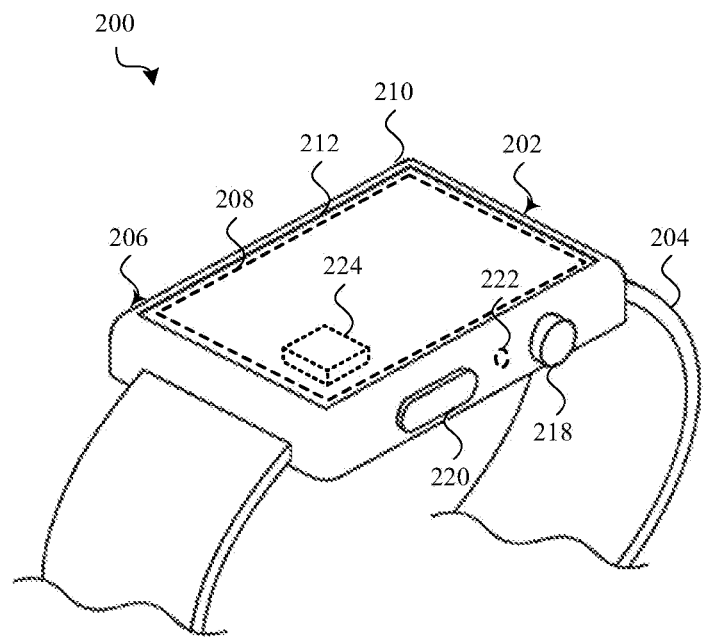
FIGS. 2A and 2B show an example wearable device that includes an optical sensor system.
Figure 2B:
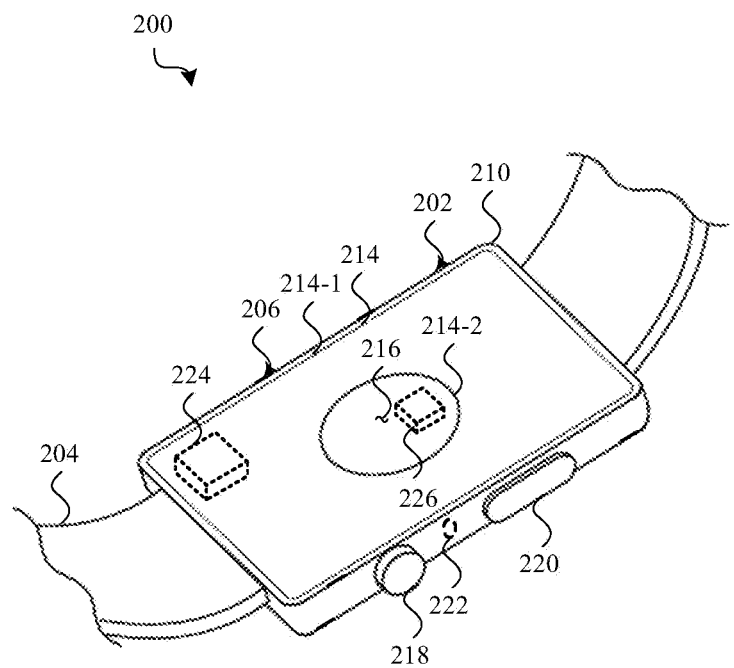

FIGS. 2A and 2B show an example wearable device 200 that includes an optical sensor system 226. The optical sensor system 226 may be used, for example, to determine the proximity of the device 200 to an object (which object may in some cases be a body part of a user, such as a wrist). Additionally or alternatively, the optical sensor system 226 may be used to determine whether the device 200 is no longer being worn by a user (e.g., to determine whether the device 200 has been removed from the user). The device's dimensions and form factor, and inclusion of a band 204 (e.g., a wrist band), suggest that the device 200 is an electronic watch or smart watch. However, the device 200 could alternatively be any wearable device, such as a health monitoring device, fitness monitoring device, audio playback device, and so on. The band 204 may alternatively take the form of a cuff or sleeve, for example. FIG. 2A shows a front isometric view of the device 200, and FIG. 2B shows a back isometric view of the device 200. The device 200 is an example of the device described with reference to FIG. 1.

The device 200 may include a body 202 (e.g., a device body or watch body) and a band 204. The body 202 may include an input or selection device, such as a crown 218 or a button 220. The band 204 may be attached to a housing 206 of the body 202, and may be used to attach (or fasten) the body 202 to a body part (e.g., an arm, wrist, leg, ankle, or waist) of a user. The body 202 may include a housing 206 that at least partially surrounds a display 208. In some embodiments, the housing 206 may include a sidewall 210, which sidewall 210 may support a front cover 212 (FIG. 2A) and/or a back cover 214 (FIG. 2B). The front cover 212 may be positioned over the display 208 and provide a window through which the display 208 can be viewed. In some embodiments, the display 208 may be attached to (or abut) the sidewall 210 and/or the front cover 212. In alternative embodiments of the device 200, the display 208 may not be included and/or the housing 206 may have an alternative configuration.

The display 208 may include one or more light-emitting elements including, for example, light-emitting elements that define a light-emitting diode (LED) display, organic LED (OLED) display, liquid crystal display (LCD), electroluminescent (EL) display, or other type of display. In some embodiments, the display 208 may include, or be associated with, one or more touch and/or force sensors that are configured to detect a touch and/or a force applied to a surface of the front cover 212.

In some embodiments, the sidewall 210 of the housing 206 may be formed using one or more metals (e.g., aluminum or stainless steel), polymers (e.g., plastics), ceramics, or composites (e.g., carbon fiber). The front cover 212 may be formed, for example, using one or more of glass, a crystal (e.g., sapphire), or a transparent polymer (e.g., plastic) that enables a user to view the display 208 through the front cover 212. In some cases, a portion of the front cover 212 (e.g., a perimeter portion of the front cover 212) may be coated with an opaque ink to obscure components included within the housing 206. In some cases, all of the exterior components of the housing 206 may be formed from a transparent material, and components within the device 200 may or may not be obscured by an opaque ink or opaque structure within the housing 206.

The back cover 214 may be formed using the same material(s) that are used to form the sidewall 210 or the front cover 212. In some cases, the back cover 214 may be part of a monolithic element that also forms the sidewall 210. In other cases, and as shown, the back cover 214 may be a multi-part back cover, such as a back cover having a first back cover portion 214-1 attached to the sidewall 210 and a second back cover portion 214-2 attached to the first back cover portion 214-1. The second back cover portion 214-2 may in some cases have a circular perimeter and an arcuate exterior surface 216 (i.e., an exterior surface 216 having an arcuate profile).

The front cover 212, back cover 214, or first back cover portion 214-1 may be mounted to the sidewall 210 using fasteners, adhesives, seals, gaskets, or other components. The second back cover portion 214-2, when present, may be mounted to the first back cover portion 214-1 using fasteners, adhesives, seals, gaskets, or other components.

A display stack or device stack (hereafter referred to as a "stack") including the display 208 may be attached (or abutted) to an interior surface of the front cover 212 and extend into an interior volume of the device 200. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 212 (e.g., to a display surface of the device 200).

In some cases, a force sensor (or part of a force sensor system) may be positioned within the interior volume above, below and/or to the side of the display 208 (and in some cases within the device stack). The force sensor (or force sensor system) may be triggered in response to the touch sensor detecting one or more touches on the front cover 212 (or a location or locations of one or more touches on the front cover 212), and may determine an amount of force associated with each touch, or an amount of force associated with the collection of touches as a whole. The force sensor (or force sensor system) may alternatively trigger operation of the touch sensor (or touch sensor system), or may be used independently of the touch sensor (or touch sensor system).

The device 200 may include various sensor systems (e.g., input devices, or input devices in combination with output devices), and in some embodiments may include some or all of the input and/or output devices included in the device described with reference to FIG. 1. In some embodiments, the device 200 may have a port 222 (or set of ports) on a side of the housing 206 (or elsewhere), and an ambient pressure sensor, ambient temperature sensor, internal/external differential pressure sensor, gas sensor, particulate matter concentration sensor, or air quality sensor may be positioned in or near the port(s) 222.

In some cases, one or more skin-facing sensor systems may be included within the device 200. By way of example, the skin-facing sensor systems may provide signals, statuses, and/or measurements to a device removal detector (e.g., an off-wrist detector), a biometric sensor, a heart-rate monitor, a respiration-rate monitor, a blood pressure monitor, a blood oxygenation monitor, and/or a blood glucose monitor. The skin-facing sensor system(s) may include optical, capacitive, resistive, self-mixing interference (SMI), or other types of sensor systems. The skin-facing sensor system may be incorporated entirely or primarily within the body 202, or entirely or primarily within the band 204. Alternatively, components of the skin-facing sensor system may be distributed amongst the body 202 and the band 204.

In some embodiments, a skin-facing sensor system may be an optical sensor system 226 including a number of electromagnetic radiation emitters (e.g., visible light and/or IR electromagnetic radiation emitters) and a number of electromagnetic radiation detectors (e.g., visible light and/or IR proximity sensors). The optical sensor system 226 may emit electromagnetic radiation through the back cover 214 and detect a return of the emitted electromagnetic radiation (e.g., a portion of the emitted electromagnetic radiation that reflects or scatters off of a user (e.g., a portion that reflects or scatters from the user's skin or clothing)). The optical sensor system 226 may be used to sense various parameters through the back cover 214, such as a user proximity and/or one or more biological parameters of the user. In some cases, the optical sensor system 226 may be used to determine whether the device 200 is no longer being worn (e.g., when the device 200 has been removed from a body part of its user).

The device 200 may include circuitry 224 (e.g., a processor and/or other components) configured to generate, at least partly in response to signals, statuses, and/or measurements received directly or indirectly from one or more of the device's sensor systems, indications of whether the device 200 is being closely worn or loosely worn, or whether the device has been removed. The various indications may be generated in response to the proximity of a user to the back surface of the housing 206 (e.g., to a back surface of the back cover 214, or to a back surface of the second back cover portion 214-2). In some cases, the circuitry 224 may transition various of the device's sensor systems to an on state, off state, or low power state (i.e., a power conserving state) in response to a determined proximity of the user and/or a determination regarding whether the device 200 is being worn. In some cases, the circuitry 224 may transition the device's display 208 and/or controls to a locked state in response to a determination that the device 200 is no longer being worn. The circuitry 224 may also or alternatively maintain or alter one or more settings, functions, or aspects of the device 200, including, in some cases, what is displayed on the display 208.

Figure 3A:
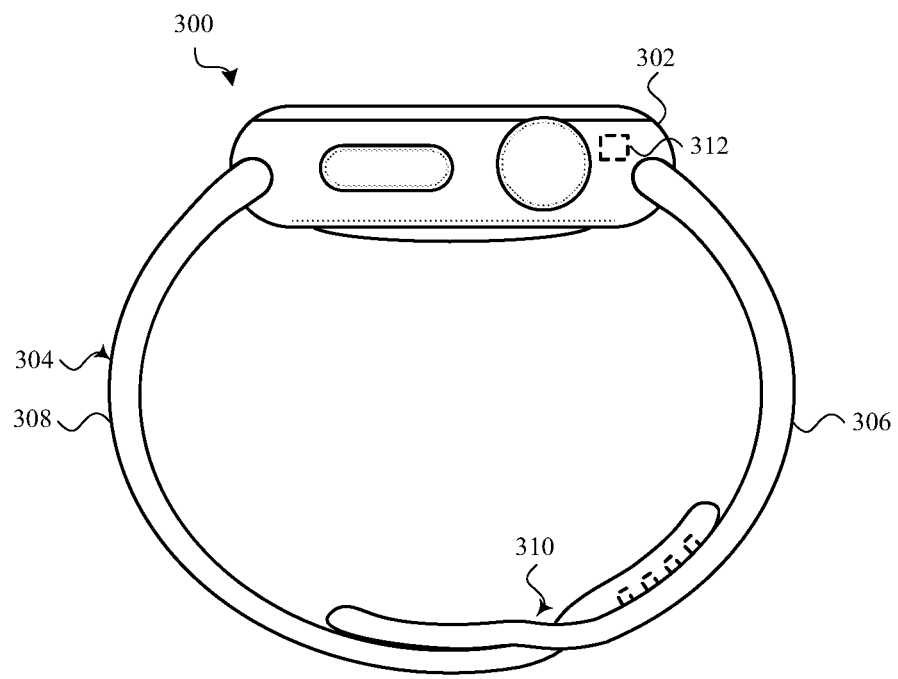
FIG. 3A shows an example wearable device having a band with a separable closure.

FIG. 3A shows an example wearable device 300 having a device body 302 and a band 304. The band 304 may be used to attach the device body 302 to a body part of a user and may include first and/or second portions 306, 308 coupled to the device body 302. In use, the first and second portions 306, 308 may be extended in different directions around a body part, and may be fastened to each other by a separable closure 310. The device body 302 may be fastened to the user with a back surface thereof facing (or abutted to) a body part of the user. In this manner, an optical sensor system housed within the device body 302 may emit electromagnetic radiation through the back surface and toward the body part, detect a returned portion of the electromagnetic radiation, and determine a proximity of the device body 302 (or the wearable device 300 in general) to the body part. Alternatively, the optical sensor system may be partly or wholly included in the band 304. In some embodiments, the wearable device 300 may be an example of the wearable device described with reference to FIG. 1 and/or FIGS. 2A-2B.

In some embodiments, and as shown, the separable closure 310 may be a pin-and-tuck closure, in which the first portion 306 of the band 304 includes a band-receiving aperture and a set of pins, and the second portion 308 of the band 304 includes a set of holes configured to receive one or more of the set of pins. To fasten the wearable device 300 to a user's wrist, an end of the second portion 308 may be inserted through the band-receiving aperture of the first portion 306, and one or more of the pins in the set of pins may be pushed through one or more of the holes in the set of holes.

In alternative example embodiments, the separable closure 310 may include a buckle attached to an end of the first portion 306 of the band 304, and the second portion 308 of the band 304 may be received through and retained within a band-receiving aperture of the buckle. In other alternative embodiments, the first and second portions 306, 308 of the band 304 may include respective portions of a hook-and-loop fastening mechanism (e.g., the first portion 306 may include hooks, and the second portion 308 may include loops). In other alternative embodiments, the first and second portions 306, 308 of the band 304 may include different poles of a magnetic fastening mechanism.

Figure 3B:
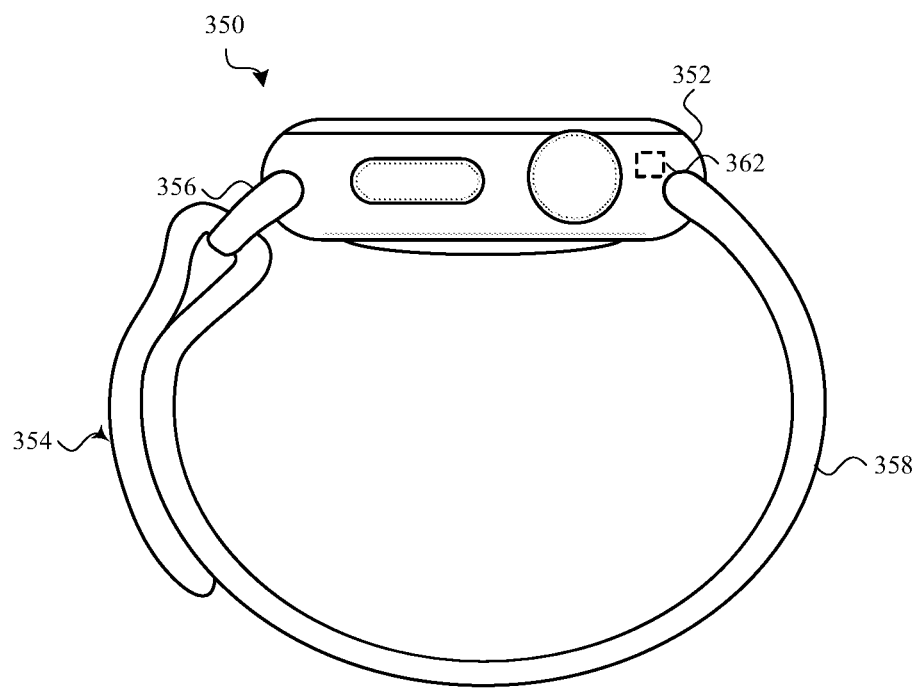
FIG. 3B shows an example wearable device having a band that forms a non-separable loop.

FIG. 3B shows an example wearable device 350 having a device body 352 and a band 354. The band 354 may be used to fasten the device body 352 to a body part of a user. The device body 352 may be fastened to the user with a back surface thereof facing (or abutted to) a body part of the user. In this manner, an optical sensor system housed within the device body 352 may emit electromagnetic radiation through the back surface and toward the body part, detect a returned portion of the electromagnetic radiation, and determine a proximity of the device body 352 (or the wearable device 350 in general) to the body part. Alternatively, the optical sensor system may be partly or wholly included in the band 354. In some embodiments, the wearable device 350 may be an example of the wearable device described with reference to FIG. 1 and/or FIGS. 2A-2B.

The band 354 may be used to attach the device body 352 to a body part of a user and may include first and second portions 356, 358 coupled to the device body 352. The first and second portions 356, 358 may be permanently or semi-permanently coupled to one another to form a non-separable loop. For example, the second portion 358 may pass through a band-receiving aperture in the first portion 356 and be retained within the band-receiving aperture by a retainer. In use, a user's body part may be inserted through the non-separable loop, and an end of the second portion 358 may be pulled to tighten the band 354 about the body part.

In some cases, the first and second portions 356, 358 of the band 354 may include respective portions of a hook-and-loop fastening mechanism (e.g., the first portion 356 may include hooks, and the second portion 358 may include loops), and the first and second portions 356, 358 may be fastened to each other to maintain a size of the non-separable loop around the user's body part. Alternatively, the first and second portions 356, 358 may be fastened to each other using a magnetic fastening mechanism or in other ways.

In alternative example embodiments, the band 354 may include a single portion having first and second opposite ends attached to the device body 352, and the single portion may form a non-separable loop configured to receive a user's body part and self-tighten around the body part.

In some cases, a band type sensor 312 or 362 may be mounted to the device body 302 or 352. The band type sensor 312 or 362 may sense what band type (e.g., a band having a separable closure, or a band having a non-separable loop, and so on) is attached to the device body 302 or 352. Sensed band types may also be based on band material, band color, band reflectivity, band construction, and so on.

Figure 4:
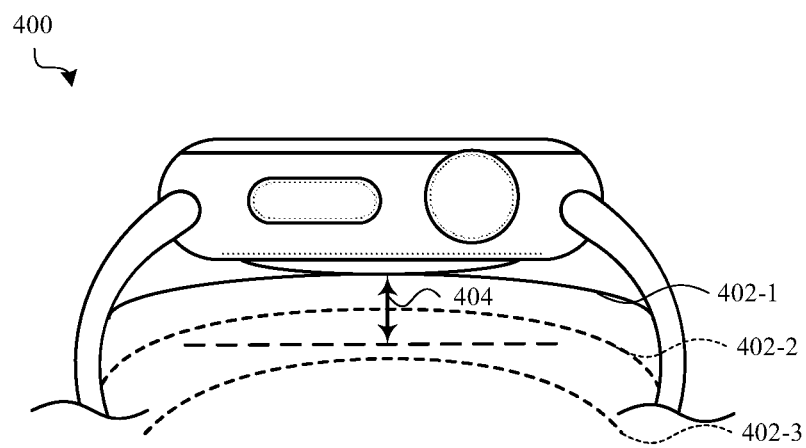
FIG. 4 illustrates how a wearable device may be worn tighter or looser on a body part of a user.

FIG. 4 illustrates how a wearable device 400 may be worn tighter or looser on a body part 402 of a user. As shown, the wearable device 400 may be worn on (e.g., positioned against) the body part 402 in a "close wear" scenario. Alternatively, the wearable device 400 may be worn such that a gap exists between the wearable device 400 and the body part 402. When the gap is less than a threshold gap 404, the wearable device 400 may be considered worn in a "loose wear" scenario. When the gap is greater than the threshold gap 404, the wearable device 400 may be considered "removed" from the body part. Body part position 402-1 illustrates a close wear scenario; body part position 402-2 illustrates a loose wear scenario; and body part position 402-3 illustrates a removed position.

Figure 5:
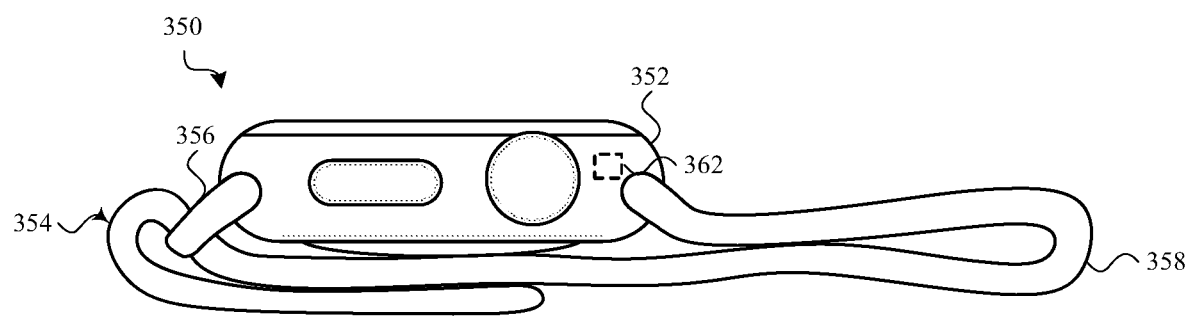
FIG. 5 shows an example elevation of the wearable device shown in FIG. 3B, after the wearable device has been removed from its user.

FIG. 5 shows an example elevation of the wearable device 350 shown in FIG. 3B, after the wearable device 350 has been removed from its user. Because the first and second portions 356, 358 of the band 354 are permanently or semi-permanently coupled to one another to form a non-separable loop, electromagnetic radiation emitted by an electromagnetic radiation emitter mounted to a back surface of the device body 352 (or to an interior surface of the band 352) may reflect off of the interior surface of the band 354 (or the back surface of the device body 352) and be strongly returned to an electromagnetic radiation detector mounted to the device body 352 (or alternatively, to the band 354). This is significant in that, when a device removal detector of the device 350 establishes a lower baseline (i.e., a lower returned portion of emitted electromagnetic radiation) for a user, and the user slips the wearable device 350 off their wrist quickly and stores it in the position shown in FIG. 4 (or possibly with a more open loop), the portion of emitted electromagnetic radiation returned from the interior surface of the band 354 (or from the back surface of the device body 352) may be great enough that an instant-off device removal threshold is never triggered. Thus, functions of the device 350 may remain unlocked, sensing functions of the device 350 may remain enabled, and so on, thereby creating a security risk, consuming power, and so on. By modifying the optical sensor system and/or device removal detector of the device 350 to compare object (e.g., body part) proximity measurements to a time-lapsed device removal threshold, or by replacing the instant-off device removal threshold with a time-lapsed device removal threshold, device removal may be detected in scenarios such as the scenario described in this paragraph (as well as in other scenarios).

In some embodiments, a wearable device such as the device described with reference to FIG. 1, 2A-2B, 3A, 3B, 4, and/or 5 may include one of the optical sensor systems shown in FIGS. 6A-6D, or alternatively may include a different optical sensor system. Each of the optical sensor systems shown in FIGS. 6A-6D includes a set of one or more electromagnetic radiation emitters, a set of one or more electromagnetic radiation detectors, and a device removal detector (e.g., an off-wrist detector) that includes a processor and/or other components.

Each electromagnetic radiation emitter shown in FIGS. 6A-6D may include a singular electromagnetic radiation source or a coordinated set of multiple electromagnetic radiation sources (i.e., a set of multiple electromagnetic radiation sources that together form a beam or flood of illumination). Each electromagnetic radiation source may take the form of a vertical-cavity surface-emitting laser (VCSEL), a vertical external-cavity surface-emitting laser (VECSEL), a quantum-dot laser (QDL), a quantum cascade laser (QCL), a light-emitting diode (LED) (e.g., an organic LED (OLED), a resonant-cavity LED (RC-LED), a micro LED (mLED), a superluminescent LED (SLED), or an edge-emitting LED), and so on. The emitted electromagnetic radiation may include, for example, visible or invisible electromagnetic radiation (e.g., green light, IR electromagnetic radiation, ultraviolet (UV) electromagnetic radiation, and so on).

Each electromagnetic radiation detector shown in FIGS. 6A-6D may include a singular electromagnetic radiation detector or a coordinated set of multiple electromagnetic radiation detectors (e.g., one or more photodiodes).

One or more optical measurement paths may be formed between the electromagnetic radiation emitter(s) and electromagnetic radiation detector(s) shown in FIGS. 6A-6D, with different optical measurement paths having different sets of parameters (e.g., different optical path lengths, different optical transmissivities, different optical emission powers, and so on). In some cases, a first optical measurement path may have a first spacing between its electromagnetic radiation emitter and electromagnetic radiation detector, and a second optical measurement path may have a second spacing between its electromagnetic radiation emitter and electromagnetic radiation detector, different from the first spacing. Additionally or alternatively, a first electromagnetic radiation emitter of the first optical measurement path may have a first orientation with respect to a first electromagnetic radiation detector of the first optical measurement path, and a second electromagnetic radiation emitter of the second optical measurement path may have a second orientation, different from the first orientation, with respect to a second electromagnetic radiation detector of the second optical measurement path. For example, the first electromagnetic radiation emitter and first electromagnetic radiation detector may have emission/reception axes that are parallel to one another, and the second electromagnetic radiation emitter and second electromagnetic radiation detector may have emission/reception axes that are non-parallel (e.g., the second electromagnetic radiation emitter may have an axis that is tilted toward or away from an axis of the second electromagnetic radiation detector, effectively decreasing or increasing the length of the second optical measurement path). Additionally or alternatively, a set of lenses, diffusers, light control films (LCFs), and/or other optical directing, shaping, and/or control elements may be disposed in one of the optical measurement paths, or different sets of lenses, diffusers, light control films (LCFs), and/or other optical directing, shaping, and/or control elements may be disposed in different optical measurement paths. An LCF may, for example, restrict the emission or reception angle of a respective emitter or detector. Additionally or alternatively, the first electromagnetic radiation emitter may have an emission power that differs from an emission power of the second electromagnetic radiation emitter, and/or the aperture sizes of the first and second electromagnetic radiation emitters or the surface areas of the first and second electromagnetic radiation detectors may differ. These and other differences in the first and second optical measurement paths, first and second electromagnetic radiation emitters, first and second electromagnetic radiation detectors, and so on, may cause the first and second optical measurement paths to have different optical path lengths and/or be associated with respective first and second different proximity detection curves for a user (e.g., as described with reference to FIGS. 7A and 7B).

Figure 6A:
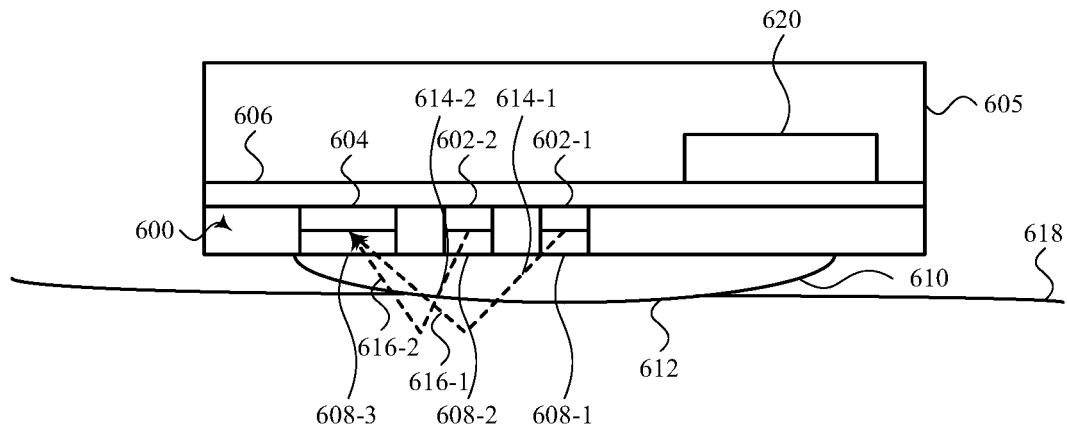
FIGS. 6A-6D show example optical sensor systems that may be included in a wearable device.

FIG. 6A shows an elevation of an example optical sensor system 600 including a first electromagnetic radiation emitter 602-1, a second electromagnetic radiation emitter 602-2, and an electromagnetic radiation detector 604. The emitters 602-1, 602-2 and detector 604 may be mounted to a device body 605 of a wearable device, and in some cases may be mounted on a common substrate 606. The emitters 602-1, 602-2 and detector 604 may alternatively be mounted within or to a wearable device in other ways. In some cases, one or more optical elements 608-1, 608-2, 608-3 may be positioned over one or more of the emitters 602-1, 602-2 and/or the detector 604. The one or more optical elements 608-1, 608-2, 608-3, when provided, may be attached to, abutted to, or formed in or on a housing component 610 that defines a back surface 612 of the device body 605.

The emitters 602-1, 602-2 may be configured to emit electromagnetic radiation 614-1, 614-2 through the back surface 612, and the detector 604 may be configured to detect a returned portion 616-1, 616-2 of the electromagnetic radiation emitted by each of the emitters 602-1, 602-2. The returned portions 616-1, 616-2 of the electromagnetic radiation may be electromagnetic radiation that reflects or scatters off of a target, such as a body part 618 on which a wearable device including the optical sensor system 600 is worn.

A first optical measurement path 614-1/616-1 may be defined between the first emitter 602-1 and the detector 604, and a second optical measurement path 614-2/616-2 may be defined between the second emitter 602-2 and the detector 604. The first and second optical measurement paths 614-1/616-1, 614-2/616-2 may have respective first and second sets of parameters, which first and second sets of parameters differ in one or more of the ways described herein (or in other ways). For example, the first and second optical measurement paths 614-1/616-1, 614-2/616-2 may have different optical path lengths.

A device removal detector 620 mounted to the substrate 606, or elsewhere within a device body, may electrically communicate with each of the emitters 602-1, 602-2 and the detector 604. In some cases, and at a first set of times, the device removal detector 620 may activate the first electromagnetic radiation emitter 602-1 and the detector 604 to obtain, from the optical sensor system 600, a first set of object proximity measurements for the first optical measurement path 614-1/616-1. At a different set of times, the device removal detector 620 may activate the second electromagnetic radiation emitter 602-2 and the detector 604 to obtain, from the optical sensor system 600, a second set of object proximity measurements for the second optical measurement path 614-2/616-2.

The object proximity measurements may indicate amounts of electromagnetic radiation received by the electromagnetic radiation detector 604 during each sample period in a set of sample periods. In some cases, an object proximity measurement in the first set of object proximity measurements and an object proximity measurement in the second set of object proximity measurements may be generated or obtained during each sample period in a set of sample periods. In other words, the object proximity measurements in the first and second sets of object proximity measurements may be generated at a same frequency. In other embodiments, the object proximity measurements in the first and second sets of object proximity measurements may be obtained at different frequencies or intervals (i.e., the object proximity measurements in the first and second sets of object proximity measurements may be generated at different frequencies).

The device removal detector 620, or a processor thereof, may compare each object proximity measurement to one or more thresholds. In some cases, the device removal detector 620 may compare each object proximity measurement in the first set of object proximity measurements to a first threshold (an instant-off threshold). The first threshold may be a fixed threshold or a threshold tied to a baseline for a particular user (i.e., a threshold that is adjusted for a particular user). When an object proximity measurement is determined to be less than the first threshold, the device removal detector 620 may generate an indication that a wearable device is no longer being worn by a user. This sort of device removal detection may capture a majority of device removals, irrespective of user characteristics, device characteristics, and so on, because the device body of a wearable device will typically be moved sufficiently far away from a user's body, and sufficiently far away from other reflective targets, during the wearable device's removal. However, in the case of some users or some types of devices or bands (e.g., devices having non-separable loop bands, such as non-separable elastic bands), there may scenarios in which an object proximity measurement never falls below the first threshold. This may occur for a variety of reasons including, for example, the user having a low baseline and the inner surface of a non-separable loop band having a high reflectivity, such that the portion of the emitted electromagnetic radiation returned by the inner surface of the band can be greater than the first threshold, thus not allowing the portion of the emitted electromagnetic radiation that is returned to the electromagnetic radiation detector 604 to fall below the first threshold if it has not already done so as the wearable device is being removed.

To account for certain device removal scenarios not captured by the removal detection described in the preceding paragraph, the device removal detector 620, or a processor thereof, may additionally or alternatively compare a subset of multiple object proximity measurements in the second set of object proximity measurements (e.g., a subset of multiple object proximity measurements obtained during a discrete time window including multiple sample periods) to a second threshold (a time-lapsed device removal threshold). The second threshold may be a fixed threshold or a threshold tied to a baseline for a particular user. In some cases, the discrete time window (i.e., a time window having bounds and not including all of time) may have a duration of about three seconds (e.g., three seconds, +/−a second). In some cases, the device removal detector 620 may generate an indication that the wearable device is no longer being worn by the user when the subset of multiple object proximity measurements is determined to be less than the second threshold. In other cases, the device removal detector 620 may only generate the indication when the second threshold is satisfied and at least one of the object proximity measurements in the subset of multiple object proximity measurements is less than a third threshold (i.e., a loose wear threshold). In other cases, the indication may only be generated when the second threshold is satisfied and a certain percentage, or all, of the object proximity measurements are less than the third threshold. In some embodiments, the determination that at least one or more object proximity measurements satisfy the third threshold may serve as a gating condition for determining whether the subset of multiple object proximity measurements in the second set of object proximity measurements satisfies the second threshold.

In some embodiments, the second threshold may correspond to a total amount of electromagnetic radiation received during the subset of multiple sample periods. In other embodiments, the second threshold may correspond to an average amount of electromagnetic radiation received per sample period in the multiple sample periods. In these embodiments, the device removal detector 620 may be configured to either 1) determine a total amount of electromagnetic radiation received for the multiple sample periods, and compare the total amount to the second threshold, or 2) determine an average amount of electromagnetic radiation received per sample period in the multiple sample periods, and compare the average amount of electromagnetic radiation to the second threshold.

The second optical measurement path, and the device removal detection method(s) associated therewith, trigger device removal events at shorter z-gaps (i.e., shorter distances between a wearable device and a body part) than the first optical measurement path and the device removal detection method(s) associated therewith. The second optical measurement path, and the device removal detection method(s) associated therewith, may therefore be better suited for detecting the removal of a non-separable elastic loop band, which band typically sits close to a user's skin and can be considered "removed" at shorter z-gaps (e.g., shorter z-gaps compared to a wearable device that is loosely attached to a user's body part using a band that has a separable closure, wherein a "z-gap" is a distance between the wearable device and the user's body part (or a distance between the band of the wearable device and the user's body part)). The time-lapsed averaging of the device removal detection method(s) associated with the second optical measurement path enable a user to jostle or adjust their band for short periods of time (e.g., about three seconds), as might occur when the user bumps their wearable device against something, or engages in certain types of movement or exercise, or momentarily tugs on or adjusts the placement of their device's band. However, device removal methods that apply the time-lapsed device removal threshold described above, possibly in combination with a loose wear threshold, can generally be configured to detect device removals at shorter z-gaps in contrast to device removal methods that apply the instant-off device removal threshold described above; and thus, a time-lapsed device removal detection method may be able to detect certain removals of devices having non-separable loop bands that may not otherwise be detected.

An example detection of device removal using the above-described first, second, and third thresholds is illustrated with reference to FIGS. 7A and 7B.

In some cases, the device removal detector 620 may additionally or alternatively compare object proximity measurements in the first or second set of object proximity measurements to other thresholds. For example, object proximity measurements in the second set of object proximity measurements may also be compared to an instant-off device removal threshold, which may be the same threshold or a different threshold than the instant-off device removal threshold to which the object proximity measurements in the first set of object proximity measurements are compared.

In some cases, multiple removal detection methods, relying on object proximity measurements obtained for the same optical measurement path or different optical measurement paths, may be used in combination, and an indication that a device is no longer worn may be generated in response to either (or any) of the removal detection methods generating a device removal indication. For example, the device removal detector 620 may generate a device removal indication in response to comparing object proximity measurements in the first set of object proximity measurements to a first set of one or more thresholds, or in response to comparing object proximity measurements in the second set of object proximity measurements to a second set of one or more thresholds.

In some cases, different removal detection methods, relying on object proximity measurements obtained for the same optical measurement path or different optical measurement paths, may be used under different conditions. For example, a wearable device that includes a band type sensor, or a wearable device that allows a user to input a band type indicator into a display of the device, may use a band type indicator received from the band type sensor or user to enable one or more removal detection methods that are appropriate for detecting removal of the device having the band type. In some cases, a device may also or alternatively enable one or more removal detection methods in response to a user's baseline or other user characteristics, other wearable device characteristics, and so on. In some cases, a removal detection method may be used for one band type, device type, user type, or combination thereof, but not for another band type, device type, user type, or combination thereof. Similarly, a sensed band type, band type input by a user, or input or sensed characteristic(s) of a user may be used to disable an optical measurement path that is not needed to identify a device removal for a particular type of band or user. For example, the emitter 602-2 associated with the second optical measurement path 614-2/616-2 may be turned off or transitioned to a low power state when a removal detection method that uses the second optical measurement path is not needed.

Figure 6B:
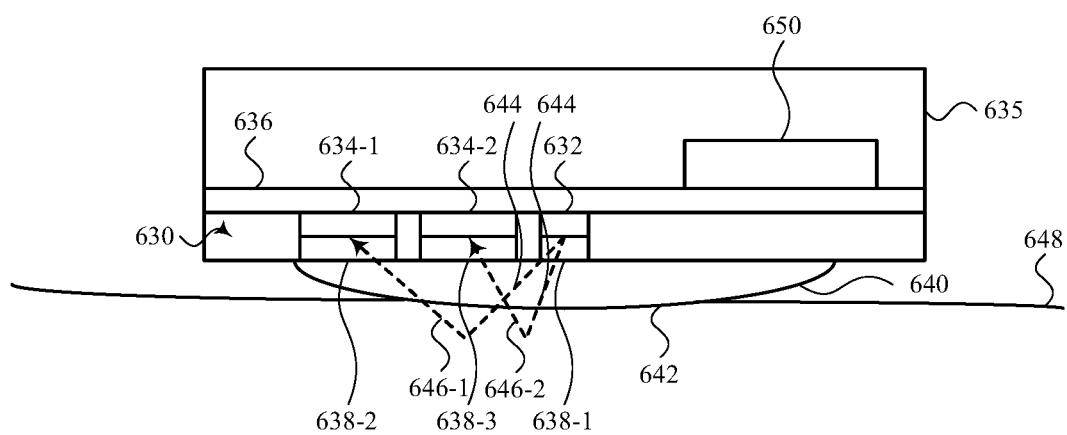

FIG. 6B shows an elevation of an example optical sensor system 630 including an electromagnetic radiation emitter 632, a first electromagnetic radiation detector 634-1, and a second electromagnetic radiation detector 634-2. The emitter 632 and detectors 634-1, 634-2 may be mounted to a device body 635 of a wearable device, and in some cases may be mounted on a common substrate 636. The emitter 632 and detectors 634-1, 634-2 may alternatively be mounted within or to a wearable device in other ways. In some cases, one or more optical elements 638-1, 638-2, 638-3 may be positioned over one or more of the emitter 632 and/or the detectors 634-1, 634-2. The one or more optical elements 638-1, 638-2, 638-3, when provided, may be attached to, abutted to, or formed in or on a housing component 640 that defines a back surface 642 of a device body 635.

The emitter 632 may be configured to emit electromagnetic radiation 644 through the back surface 642, and the detectors 634-1, 634-2 may be configured to detect a returned portion 646-1 or 646-2 of the electromagnetic radiation emitted by the emitter 632. The returned portions 646-1, 646-2 of the electromagnetic radiation may be electromagnetic radiation that reflects or scatters off of a target, such as a body part 648 on which a wearable device including the optical sensor system 630 is worn.

A first optical measurement path 644/646-1 may be defined between the emitter 632 and the first detector 634-1, and a second optical measurement path 644/646-2 may be defined between the emitter 632 and the second detector 634-2. The first and second optical measurement paths 644/646-1, 644/646-2 may have respective first and second sets of parameters, which first and second sets of parameters differ in one or more of the ways described herein (or in other ways). For example, the first and second optical measurement paths 644-1/646-1, 644-2/646-2 may have different optical path lengths.

A device removal detector 650 mounted to the substrate 636, or elsewhere within a device body, may electrically communicate with the emitter 632 and each of the detectors 634-1, 634-2. In some cases, and at a first set of times, the device removal detector 650 may activate the electromagnetic radiation emitter 632, the first electromagnetic radiation detector 634-1, and the second electromagnetic radiation detector 634-2 contemporaneously, to obtain, from the optical sensor system 630, a first set of object proximity measurements for the first optical measurement path 648-1 and a second set of object proximity measurements for the second optical measurement path 648-2. The device removal detector 650 may use the object proximity measurements as described with reference to FIG. 6A, or in other ways, to detect the removal of a wearable device from a body part of a user.

Figure 6C:
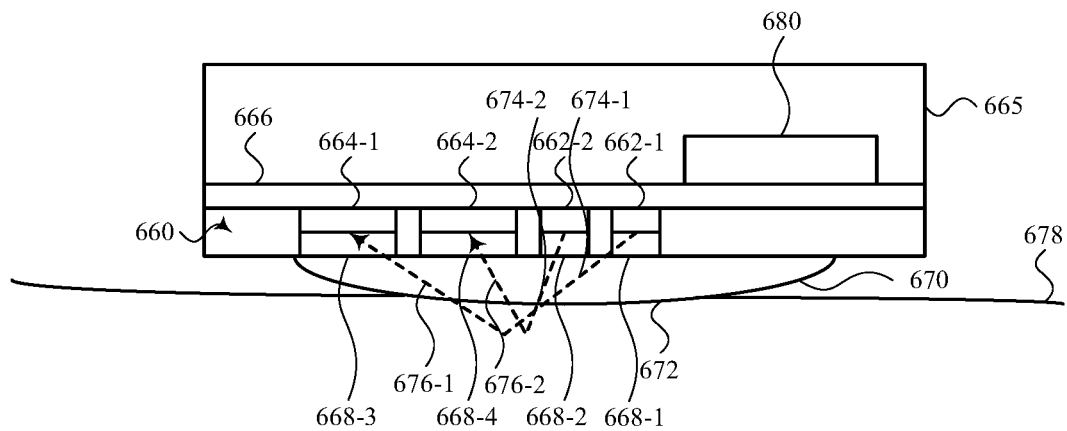

FIG. 6C shows an elevation of an example optical sensor system 660 including a first electromagnetic radiation emitter 662-1, a second electromagnetic radiation emitter 662-2, a first electromagnetic radiation detector 664-1, and a second electromagnetic radiation detector 664-2. The emitters 662-1, 662-2 and detectors 664-1, 664-2 may be mounted to a device body of a wearable device, and in some cases may be mounted on a common substrate 666. The emitters 662-1, 662-2 and detectors 664-1, 664-2 may alternatively be mounted within or to a wearable device in other ways. In some cases, one or more optical elements 668-1, 668-2, 668-3, 668-4 may be positioned over one or more of the emitters 662-1, 662-2 and/or the detectors 664-1, 664-2. The one or more optical elements 668-1, 668-2, 668-3, 668-4, when provided, may be attached to, abutted to, or formed in or on a housing component 670 that defines a back surface 672 of a device body.

The emitters 662-1, 662-2 may be configured to emit electromagnetic radiation 674-1, 674-2 through the back surface 672, and the detectors 664-1, 664-2 may be configured to detect respective returned portions 676-1, 676-2 of the electromagnetic radiation emitted by the emitters 662-1, 662-2. The returned portions 676-1, 676-2 of the electromagnetic radiation may include electromagnetic radiation that reflects or scatters off of a target, such as a body part 678 on which a wearable device including the optical sensor system 660 is worn.

A first optical measurement path 674-1/676-1 may be defined between the first emitter 662-1 and the first detector 664-1, and a second optical measurement path 674-2/676-2 may be defined between the second emitter 662-2 and the second detector 664-2. The first and second optical measurement paths 674-1/676-1, 674-2/676-2 may have respective first and second sets of parameters, which first and second sets of parameters differ in one or more of the ways described herein (or in other ways). For example, the first and second optical measurement paths 674-1/676-1, 674-2/676-2 may have different optical path lengths.

A device removal detector 680 mounted to the substrate 666, or elsewhere within a device body, may electrically communicate with each of the emitters 662-1, 662-2 and the detectors 664-1, 664-2. In some cases, the first emitter 662-1 and first detector 664-1 may emit/detect a first wavelength of electromagnetic radiation, and the second emitter 662-2 and second detector 664-2 may emit/detect a second wavelength of electromagnetic radiation, different from the first wavelength of electromagnetic radiation. In these cases, the device removal detector 680 may activate all of the emitters 662-1, 662-2 and detectors 664-1, 664-2 contemporaneously, to obtain, from the optical sensor system 660, a first set of object proximity measurements for the first optical measurement path 674-1/676-1 and a second set of object proximity measurements for the second optical measurement path 674-2/676-2. The device removal detector 680 may use the object proximity measurements as described with reference to FIG. 6A, or in other ways, to detect the removal of a wearable device from a body part 678 of a user.

Figure 6D:
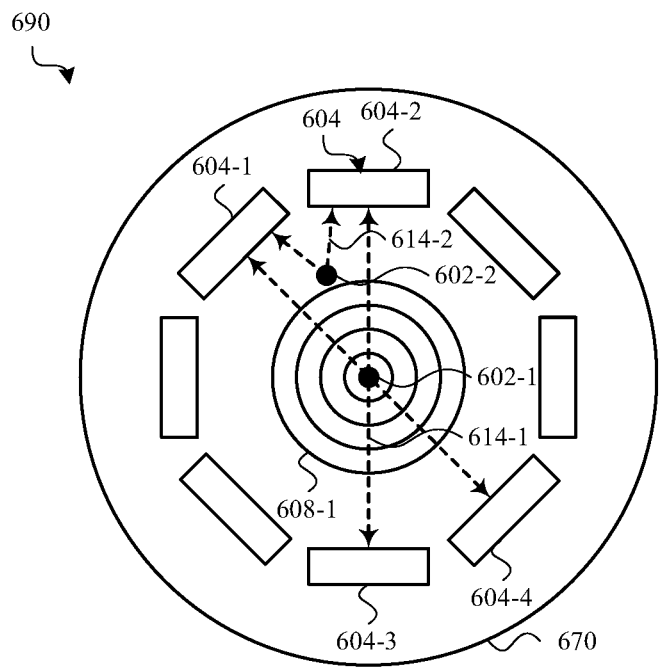

FIG. 6D shows a plan view of an example optical sensor system 690, which system is an example of the optical sensor system described with reference to FIG. 6A. The optical sensor system 690 includes a first electromagnetic radiation emitter 602-1, a second electromagnetic radiation emitter 602-2, and an electromagnetic radiation detector 604. By way of example, the first emitter 602-1 is positioned in or near the center of a sensing area, and the detector 604 includes a set of four photodiodes 604-1, 604-2, 604-3, 604-4 disposed equidistant from the first emitter 602-1. The outputs of the four photodiodes 604-1, 604-2, 604-3, 604-4 may be combined to provide an integrated output of the detector 604. The second emitter 602-2 may be positioned between the first emitter 602-1 and two of the photodiodes 604-1, 604-2.

An optional Fresnel lens, other focusing lens, or other optical element(s) 608-1 may be positioned in the optical emission path of the first emitter 602-1. An optional LCF or other optical element(s) may be positioned in the optical reception path of each of the four photodiodes 604-1, 604-2, 604-3, 604-4.

Electromagnetic radiation 614-2 emitted by the second emitter 602-2 may be returned to any one or more of the four photodiodes 604-1, 604-2, 604-3, 604-4, but will typically be returned primarily to the two photodiodes 604-1, 604-2 to which it is closer. In contrast, electromagnetic radiation 614-1 emitted by the first emitter 602-1 may be returned to any one or more of the four photodiodes 604-1, 604-2, 604-3, 604-4, but may be returned more diffusely to the photodiodes 604-1, 604-2, 604-3, 604-4 than the electromagnetic radiation 614-1 emitted by the second emitter 602-2 is returned to the two photodiodes 604-1 and 604-2. This is due, in part, to the greater spacing between the first emitter 602-1 and the photodiodes 604-1, 604-2, 604-3, 604-4, and to the provision and configurations of the optical elements 608-1, 608-3.

In some cases, the optical sensor system described with reference to any of FIGS. 6A-6D may rely on a single optical measurement path. In these cases, the optical sensor system may only include a single electromagnetic radiation emitter and a single electromagnetic radiation detector (though others may be used as well). In these cases, the first, second, and third thresholds described above (i.e., the instant-off device removal threshold, the time-lapsed device removal threshold, and the loose wear threshold) may all be applied to a single set of object proximity measurements obtained for a single optical measurement path.

Figure 7A:
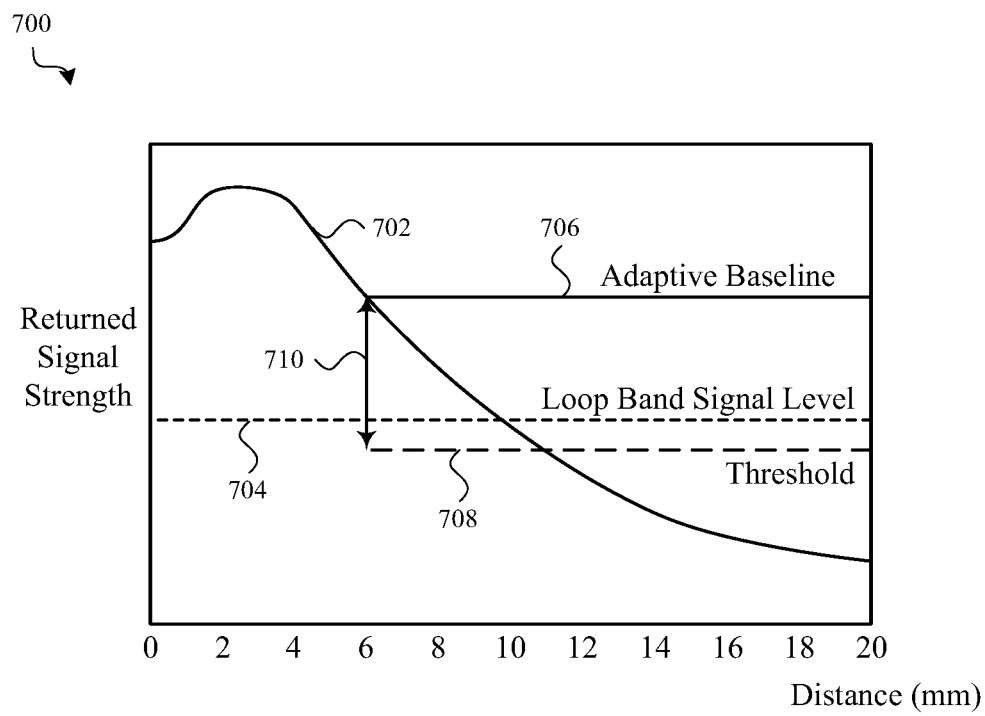
FIGS. 7A and 7B show examples of different proximity detection curves for different optical measurement paths of an optical sensor system.
Figure 7B:
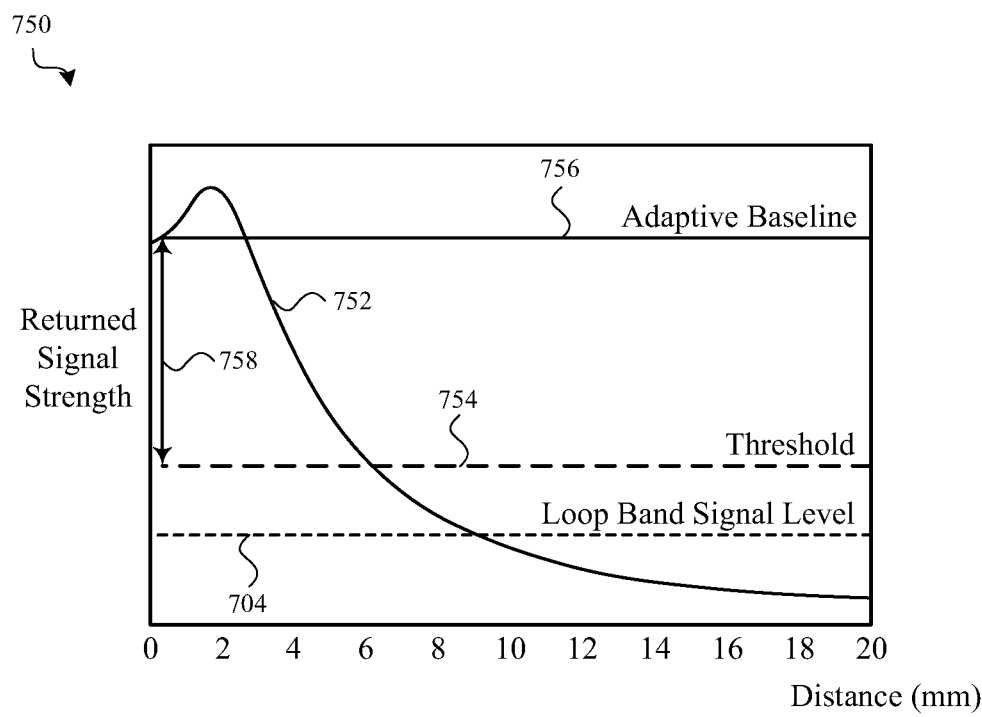

FIGS. 7A and 7B show examples of different proximity detection curves for different optical measurement paths (e.g., different optical measurement paths having different optical lengths) of an optical sensor system. In some embodiments, the proximity detection curve 702 shown in FIG. 7A may be associated with the first optical measurement path described with any of FIGS. 6A-6D, and the proximity detection curve 752 shown in FIG. 7B may be associated with the second optical measurement path described with reference to any of FIGS. 6A-6D. Each proximity detection curve is plotted in a graph 700 or 750 of returned signal strength versus distance in millimeters (mm). The returned signal strength may correspond to an amount of emitted electromagnetic radiation returned to an electromagnetic radiation detector after reflecting or scattering off of a target such as a body part. The returned signal strength, or returned amount of emitted electromagnetic radiation, may also correspond to a distance or proximity of a user to a wearable device.

Each graph 700, 750 shows a "loop band signal level" 704 which corresponds to an amount of emitted electromagnetic radiation that may be returned to an electromagnetic radiation detector after reflecting or scattering off of the interior surface of a non-separable loop band. The loop band signal level 704 is shown at different elevations in the two graphs 700, 750 because the graphs 700, 750 are normalized to the peak returned signal values of their respective proximity detection curves 702, 752.

FIG. 7A shows a proximity detection curve 702 having a peak returned signal value at a wearable device to body part gap (or distance) of about 2-4 mm. The returned signal value then slowly decays on either side of the peak returned signal value. A device removal detector that is configured to compare object proximity measurements to an instant-off device removal threshold 708 may, in some cases, establish an adaptive baseline 706 for a user. The adaptive baseline 706 may correspond to how close or loose a user wears a wearable device. After adaptively baselining a user, the device removal detector may set the instant-off device removal threshold 708 as a fixed value or fixed percentage drop 710 from the adaptive baseline 706. When a change in the returned signal value is greater than the fixed value or fixed percentage drop 710, the device removal detector may generate an indication that a device is no longer being worn. Removal may in some cases be indicated, for example, at a wearable device to body part gap of 10 mm or greater.

When a device body is attached to a body part of a user using a band with a separable clasp, the loop band signal level 704 is irrelevant, and for a user who wears their wearable device looser and adaptively baselines at a lower returned signal value, a device removal is simply indicated at a greater wearable device to body part gap (i.e., at a greater distance). However, when a device body is attached to a body part of a user using a non-separable loop band, the loop band signal level 704 may prevent a device removal from being indicated when the user wears their wearable device looser and adaptively baselines at a lower returned signal value (or when a user's skin characteristics cause a reduction in the peak returned signal value of the proximity detection curve 702). Thus, if a device removal is not indicated before the wearable device is completely removed, the detection of electromagnetic radiation returned from the interior surface of the non-separable loop band may prevent the device removal detector from detecting the device removal.

In comparison to the proximity detection curve shown in FIG. 7A, FIG. 7B shows a proximity detection curve 752 having a peak returned signal value at a wearable device to body part gap (or distance) of about 1-2 mm. The returned signal value then decays more rapidly on either side of the peak returned signal value (i.e., more rapidly than for the proximity detection curve shown in FIG. 7A). A device removal detector that is configured to compare object proximity measurements to a time-lapsed device removal threshold 754 may, in some cases, establish an adaptive baseline 756 for a user. After adaptively baselining the user, the device removal detector may set the time-lapsed device removal threshold 754 as a fixed value or fixed percentage drop 758 from the adaptive baseline 756. When a change in the returned signal value is greater than the fixed value or fixed percentage drop 758, the device removal detector may generate an indication that a device is no longer being worn. Removal may be indicated, for example, at a wearable device to body part gap of 6-10 mm or greater that lasts longer than a duration of a discrete time window (e.g., a discrete time window having a duration of about 3 seconds). In some cases, the duration of the discrete time window may be made longer when the decay of the proximity detection curve 752 is steeper.

When a device body is attached to a body part of a user using a band with a separable clasp, the loop band signal level 704 is irrelevant, and for a user who wears their wearable device looser and adaptively baselines at a lower returned signal value, a device removal is simply indicated at a greater wearable device to body part gap. In addition, when a device body is attached to a body part of a user using a non-separable loop band, the loop band signal level 704 may be low enough with respect to the peak returned signal value that the loop band signal level 704 does not prevent a device removal from being indicated when a user wears their wearable device looser (or when a user's skin characteristics cause a reduction in the peak returned signal value of the proximity detection curve 752).

Figure 8:
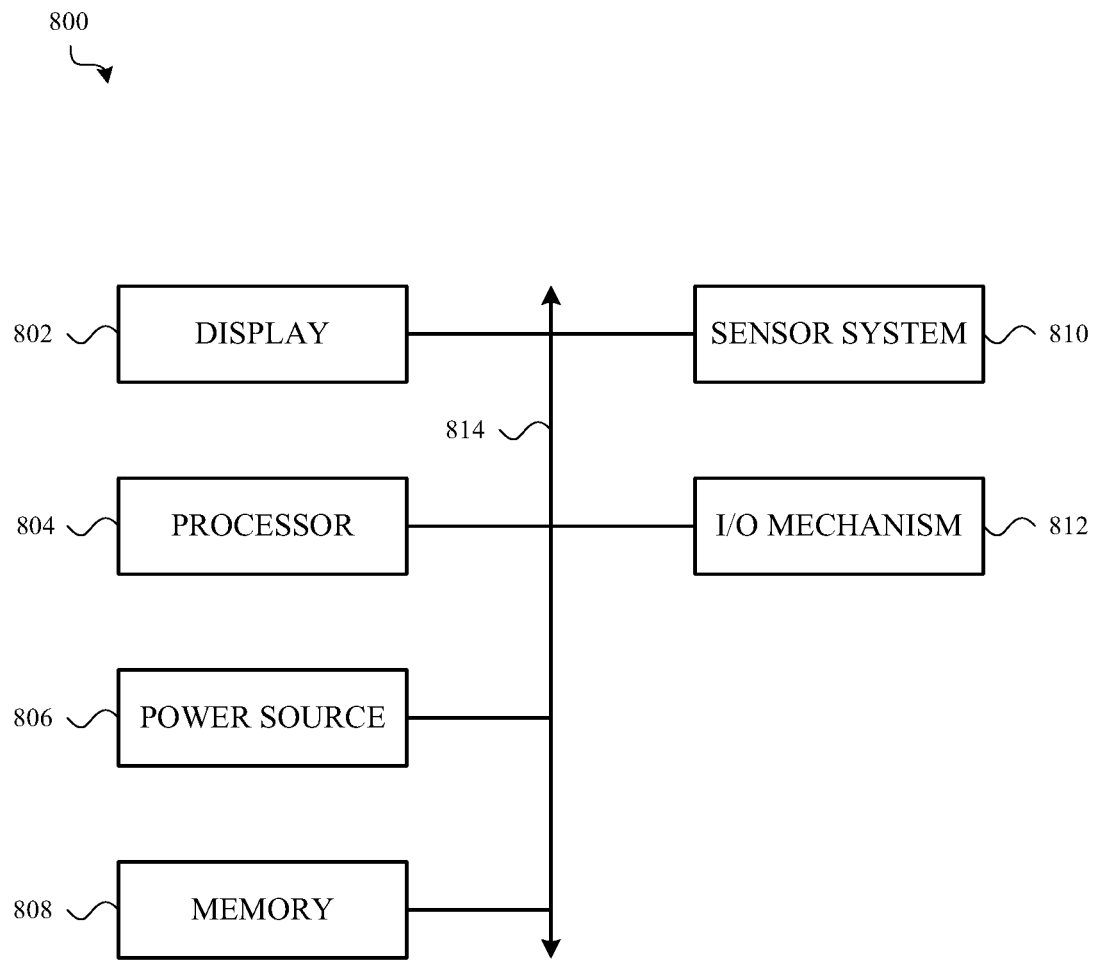
FIG. 8 shows an example electrical block diagram of an electronic device, which electronic device may in some cases be implemented as one of the wearable devices described with reference to any of FIGS. 1-5, and/or as a device including the optical sensor system described with reference to any of FIGS. 6A-7B.

FIG. 8 shows an example electrical block diagram of an electronic device 800, which electronic device may in some cases be implemented as one of the wearable devices described with reference to any of FIGS. 1-5, and/or as a device including the optical sensor system described with reference to any of FIGS. 6A-7B. The electronic device 800 may include an electronic display 802 (e.g., a light-emitting display), a processor 804, a power source 806, a memory 808 or storage device, a sensor system 810, or an input/output (I/O) mechanism 812 (e.g., an input/output device, input/output port, or haptic input/output interface). The processor 804 may control some or all of the operations of the electronic device 800. The processor 804 may communicate, either directly or indirectly, with some or all of the other components of the electronic device 800. For example, a system bus or other communication mechanism 814 can provide communication between the electronic display 802, the processor 804, the power source 806, the memory 808, the sensor system 810, and the I/O mechanism 812.

The processor 804 may be implemented as any electronic device capable of processing, receiving, or transmitting data or instructions, whether such data or instructions is in the form of software or firmware or otherwise encoded. For example, the processor 804 may include a microprocessor, a central processing unit (CPU), an application-specific integrated circuit (ASIC), a digital signal processor (DSP), a controller, or a combination of such devices. As described herein, the term "processor" is meant to encompass a single processor or processing unit, multiple processors, multiple processing units, or other suitably configured computing element or elements. In some cases, the processor 804 may provide part or all of the device removal detector described with reference to FIGS. 6A-7B.

It should be noted that the components of the electronic device 800 can be controlled by multiple processors. For example, select components of the electronic device 800 (e.g., the sensor system 810) may be controlled by a first processor and other components of the electronic device 800 (e.g., the electronic display 802) may be controlled by a second processor, where the first and second processors may or may not be in communication with each other.

The power source 806 can be implemented with any device capable of providing energy to the electronic device 800. For example, the power source 806 may include one or more batteries or rechargeable batteries. Additionally or alternatively, the power source 806 may include a power connector or power cord that connects the electronic device 800 to another power source, such as a wall outlet.

The memory 808 may store electronic data that can be used by the electronic device 800. For example, the memory 808 may store electrical data or content such as, for example, audio and video files, documents and applications, device settings and user preferences, timing signals, control signals, and data structures or databases. The memory 808 may include any type of memory. By way of example only, the memory 808 may include random access memory, read-only memory, Flash memory, removable memory, other types of storage elements, or combinations of such memory types.

The electronic device 800 may also include a sensor system 810, including sensors positioned almost anywhere on the electronic device 800. In some cases, the sensor system 810 may include one or more electromagnetic radiation emitters and detectors, positioned and/or configured as described with reference to any of FIGS. 1-6D. The sensor system 810 may be configured to sense one or more type of parameters, such as but not limited to, vibration; light; touch; force; heat; movement; relative motion; biometric data (e.g., biological parameters) of a user; air quality; proximity; position; connectedness; device placement or removal; matter type; and so on. By way of example, the sensor system 810 may include one or more of (or multiple of) a heat sensor, a position sensor, a proximity sensor, a light or optical sensor (e.g., an electromagnetic radiation emitter and/or detector), an accelerometer, a pressure transducer, a gyroscope, a magnetometer, a health monitoring sensor, and an air quality sensor, and so on. Additionally, the sensor system 810 may utilize any suitable sensing technology, including, but not limited to, interferometric, magnetic, pressure, capacitive, ultrasonic, resistive, optical, acoustic, piezoelectric, or thermal technologies.

The I/O mechanism 812 may transmit or receive data from a user or another electronic device. The I/O mechanism 812 may include the electronic display 802, a touch sensing input surface, a crown, one or more buttons (e.g., a graphical user interface "home" button), one or more cameras (including an under-display camera), one or more microphones or speakers, one or more ports such as a microphone port, and/or a keyboard. Additionally or alternatively, the I/O mechanism 812 may transmit electronic signals via a communications interface, such as a wireless, wired, and/or optical communications interface. Examples of wireless and wired communications interfaces include, but are not limited to, cellular and Wi-Fi communications interfaces.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An electronic device, comprising:
a device body having a back surface;
a band configured to fasten the device body to a user with the back surface facing a body part of the user;
an optical sensor system having a first optical measurement path and a second optical measurement path, wherein the first optical measurement path has a first optical path length that differs from a second optical path length of the second optical measurement path, the optical sensor system configured to,
generate object proximity measurements in a first set of object proximity measurements, for the first optical measurement path, at a first measurement frequency and sample period; and
generate object proximity measurements in a second set of object proximity measurements, for the second optical measurement path, at a second measurement frequency and sample period that differs from the first measurement frequency and sample period; and
a device removal detector configured to generate a device removal indication responsive to either of,
the first set of object proximity measurements received from the optical sensor system for the first optical measurement path; or
the second set of object proximity measurements received from the optical sensor system for the second optical measurement path.

2. The electronic device of claim 1, wherein:
the device removal detector compares measurements in the second set of object proximity measurements to each of,
a loose wear threshold; and
a time-lapsed device removal threshold.

3. The electronic device of claim 2, wherein the device removal detector further compares the measurements in the second set of object proximity measurements to an instant-off device removal threshold.

4. The electronic device of claim 2, wherein the device removal detector compares object proximity measurements in the first set of object proximity measurements to an instant-off device removal threshold.

5. The electronic device of claim 1, wherein:
the device body is a watch body; and
the device removal detector is an off-wrist detector.

6. A wearable device, comprising:
a device body having a back surface;
a set of electromagnetic radiation emitters and electromagnetic radiation detectors including,
a first electromagnetic radiation emitter mounted to the device body and configured to emit electromagnetic radiation through the back surface;
a first electromagnetic radiation detector mounted to the device body and configured to detect a returned portion of the electromagnetic radiation emitted by the first electromagnetic radiation emitter; and at least one of a second electromagnetic radiation emitter or a second electromagnetic radiation detector mounted to the device body and configured to respectively emit or detect electromagnetic radiation through the back surface; wherein,
the set of electromagnetic radiation emitters and electromagnetic radiation detectors defines at least,
a first optical measurement path between the first electromagnetic radiation emitter and the first electromagnetic radiation detector, having a first optical path length; and
a second optical measurement path having a second optical path length that differs from the first optical path length; and
a processor configured to,
receive indications of an amount of electromagnetic radiation received by the first electromagnetic radiation detector during each sample period in a first set of sample periods;
receive indications of an amount of electromagnetic radiation received via the second optical measurement path during each sample period in a second set of sample periods; and
generate an indication that the wearable device is no longer worn by a user after,
determining that a first amount of electromagnetic radiation received by the first electromagnetic radiation detector during a sample period of the first set of sample periods is less than a first threshold;
determining that a second amount of electromagnetic radiation is less than a second threshold, the second amount of electromagnetic radiation received by the first electromagnetic radiation detector during a discrete time window including multiple sample periods of the first set of sample periods, the multiple sample periods including the sample period; and
determining that a third amount of electromagnetic radiation received via the second optical measurement path during a sample period of the second set of sample periods is less than a third threshold.

7. The wearable device of claim 6, further comprising: a band configured to attach the device body to the user.

8. The wearable device of claim 6, wherein the second optical measurement path includes the second electromagnetic radiation emitter and the first electromagnetic radiation detector.

9. The wearable device of claim 6, wherein the second optical measurement path includes the first electromagnetic radiation emitter and the second electromagnetic radiation detector.

10. The wearable device of claim 6, further comprising:
a band type sensor mounted to the device body; wherein,
the processor is configured to,
receive a band type indicator from the band type sensor; and
generate the indication that the device body is no longer worn by the user, after determining that the first amount of electromagnetic radiation is less than the first threshold and after determining that the second amount of electromagnetic radiation is less than the second threshold, when the received band type indicator indicates a first type of band, but not when the received band type indicator indicates a second type of band.

11. The wearable device of claim 6, further comprising:
a display mounted to the device body; wherein,
the processor is configured to,
receive a band type indicator input by the user using at least the display; and
generate the indication that the device body is no longer worn by the user, after determining that the first amount of electromagnetic radiation is less than the first threshold and after determining that the second amount of electromagnetic radiation is less than the second threshold, when the received band type indicator indicates a first type of band, but not when the received band type indicator indicates a second type of band.

12. The wearable device of claim 6, wherein the discrete time window has a duration of about three seconds.

13. The wearable device of claim 6, wherein the processor is configured to determine that the second amount of electromagnetic radiation is less than the second threshold by:
determining an average amount of electromagnetic radiation received per sample period in the multiple sample periods; and
comparing the average amount of electromagnetic radiation to the second threshold.

14. An electronic device, comprising:
a device body having a back surface;
a band configured to fasten the device body to a user with the back surface facing a body part of the user;
an optical sensor system having a first optical measurement path and a second optical measurement path, wherein the first optical measurement path has a first optical path length that differs from a second optical path length of the second optical measurement path, the optical sensor system configured to,
generate object proximity measurements in a first set of object proximity measurements, for the first optical measurement path, at a measurement frequency and sample period; and
generate object proximity measurements in a second set of object proximity measurements, for the second optical measurement path, at the measurement frequency and sample period; and
a device removal detector configured to generate a device removal indication responsive to either of,
the first set of object proximity measurements received from the optical sensor system for the first optical measurement path; or
the second set of object proximity measurements received from the optical sensor system for the second optical measurement path.

15. The electronic device of claim 14, wherein:
the device removal detector compares measurements in the second set of object proximity measurements to each of,
a loose wear threshold; and
a time-lapsed device removal threshold.

16. The electronic device of claim 15, wherein the device removal detector further compares the measurements in the second set of object proximity measurements to an instant-off device removal threshold.

17. The electronic device of claim 15, wherein the device removal detector compares object proximity measurements in the first set of object proximity measurements to an instant-off device removal threshold.

18. The electronic device of claim 14, wherein:
the device body is a watch body; and
the device removal detector is an off-wrist detector.

\* \* \* \* \*